(12) United States Patent
Hokai et al.

(10) Patent No.: US 12,097,736 B2
(45) Date of Patent: Sep. 24, 2024

(54) VEHICLE AND VEHICLE OPERATING METHOD

(71) Applicant: TOYOTA JIDOSHA KABUSHIKI KAISHA, Toyota Aichi-ken (JP)

(72) Inventors: Keisuke Hokai, Gotemba Shizuoka-ken (JP); Hiromitsu Urano, Numazu Shizuoka-ken (JP); Kunihito Satou, Mishima Shizuoka-ken (JP); Masahiro Harada, Ebina Kanagawa-ken (JP); Hojung Jung, Shizuoka-ken (JP); Shuichi Yoshikawa, Gotemba Shizuoka-ken (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 212 days.

(21) Appl. No.: 17/533,440

(22) Filed: Nov. 23, 2021

(65) Prior Publication Data
US 2022/0176768 A1 Jun. 9, 2022

(30) Foreign Application Priority Data
Dec. 9, 2020 (JP) .................. 2020-204493

(51) Int. Cl.
*B60G 17/0165* (2006.01)
*B60G 17/052* (2006.01)
*B60G 17/056* (2006.01)
*B60W 10/22* (2006.01)
*B60W 60/00* (2020.01)
(Continued)

(52) U.S. Cl.
CPC ..... *B60G 17/0165* (2013.01); *B60G 17/0528* (2013.01); *B60G 17/0565* (2013.01); *B60W 10/22* (2013.01); *B60W 60/001* (2020.02); *G05D 1/0038* (2013.01); *G06V 20/58* (2022.01);
(Continued)

(58) Field of Classification Search
None
See application file for complete search history.

(56) References Cited

U.S. PATENT DOCUMENTS 10,066,367 B1* 9/2018 Wang .................. E02F 9/265
2017/0349023 A1 12/2017 Mori
(Continued)

FOREIGN PATENT DOCUMENTS

DE 102011115353 A1 4/2012
DE 102017106759 A1 12/2017
(Continued)

*Primary Examiner* — Hunter B Lonsberry
*Assistant Examiner* — Paysun Wu
(74) *Attorney, Agent, or Firm* — Dinsmore & Shohl LLP

(57) ABSTRACT

A vehicle includes an outside sensor configured to acquire information on an outside circumstance of the vehicle, a vehicle height adjusting device configured to adjust a vehicle height, and a control device configured to control the vehicle. The control device is configured to control the vehicle height adjusting device such that the vehicle height becomes a vehicle height corresponding to a platform condition at a predetermined stop position when the vehicle stops at the predetermined stop position. The control device is configured to control the vehicle height adjusting device based on a height of an obstacle such that the obstacle does not interfere with the vehicle when the obstacle is detected at the predetermined stop position by the outside sensor.

8 Claims, 14 Drawing Sheets

(51) Int. Cl.
*G05D 1/00* (2024.01)
*G06V 20/58* (2022.01)

(52) U.S. Cl.
CPC .. *B60G 2800/914* (2013.01); *B60G 2800/964* (2013.01); *B60W 2710/22* (2013.01)

(56) References Cited

U.S. PATENT DOCUMENTS

| | | | |
|---|---|---|---|
| 2018/0111608 A1 | 4/2018 | Kim | |
| 2019/0083334 A1* | 3/2019 | MacPherson | A61G 3/061 |
| 2019/0193505 A1 | 6/2019 | Balogh et al. | |
| 2022/0105772 A1* | 4/2022 | Kim | B60G 17/0165 |
| 2022/0153266 A1* | 5/2022 | Muyshondt | B60W 40/04 |

FOREIGN PATENT DOCUMENTS

| | | |
|---|---|---|
| DE | 102016116856 A1 | 3/2018 |
| DE | 102017009938 A1 | 4/2018 |
| DE | 102017111054 A1 | 11/2018 |
| JP | H09-039539 A | 2/1997 |
| JP | 2017-217933 A | 12/2017 |
| KR | 10-2019-0097705 A | 8/2019 |

\* cited by examiner

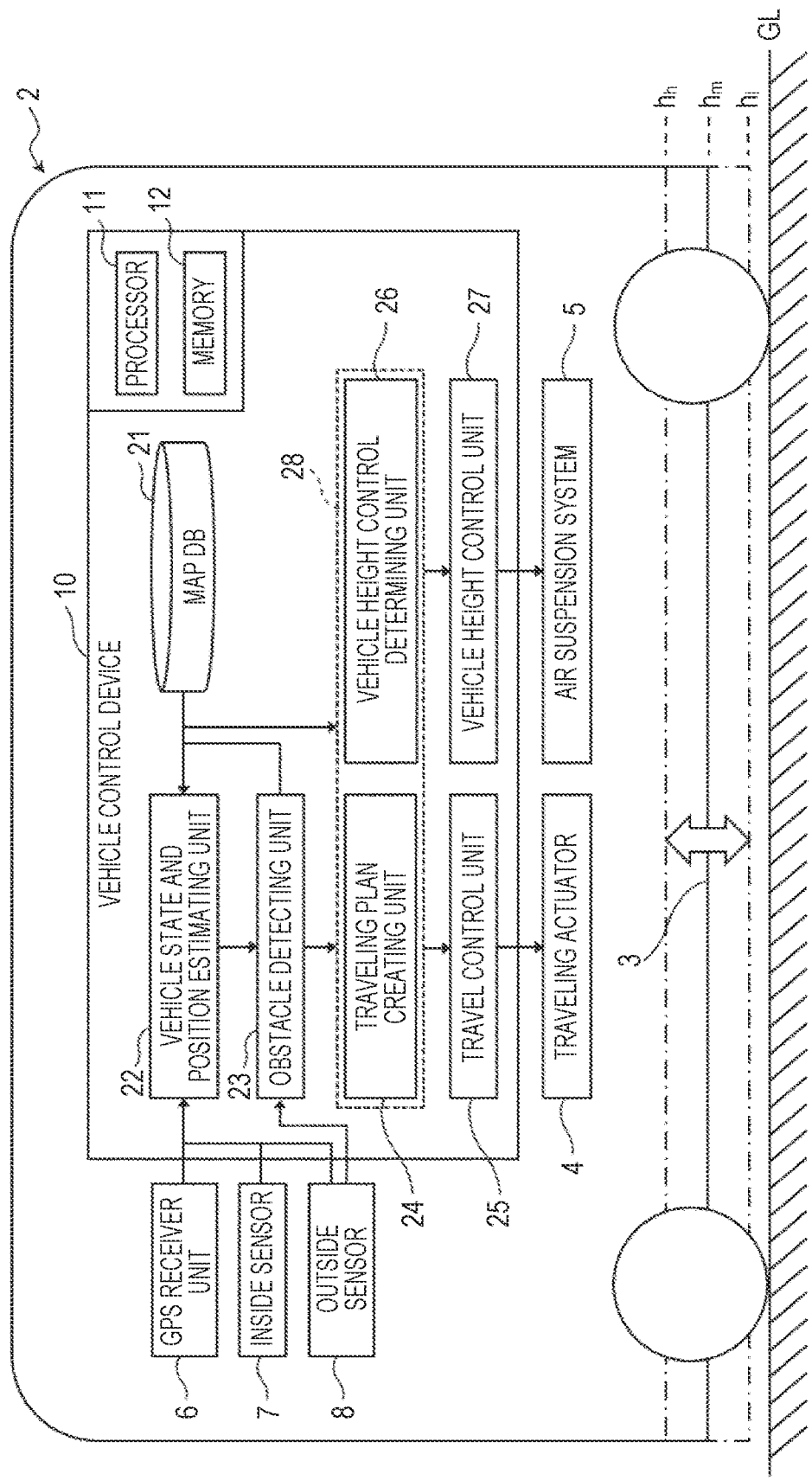

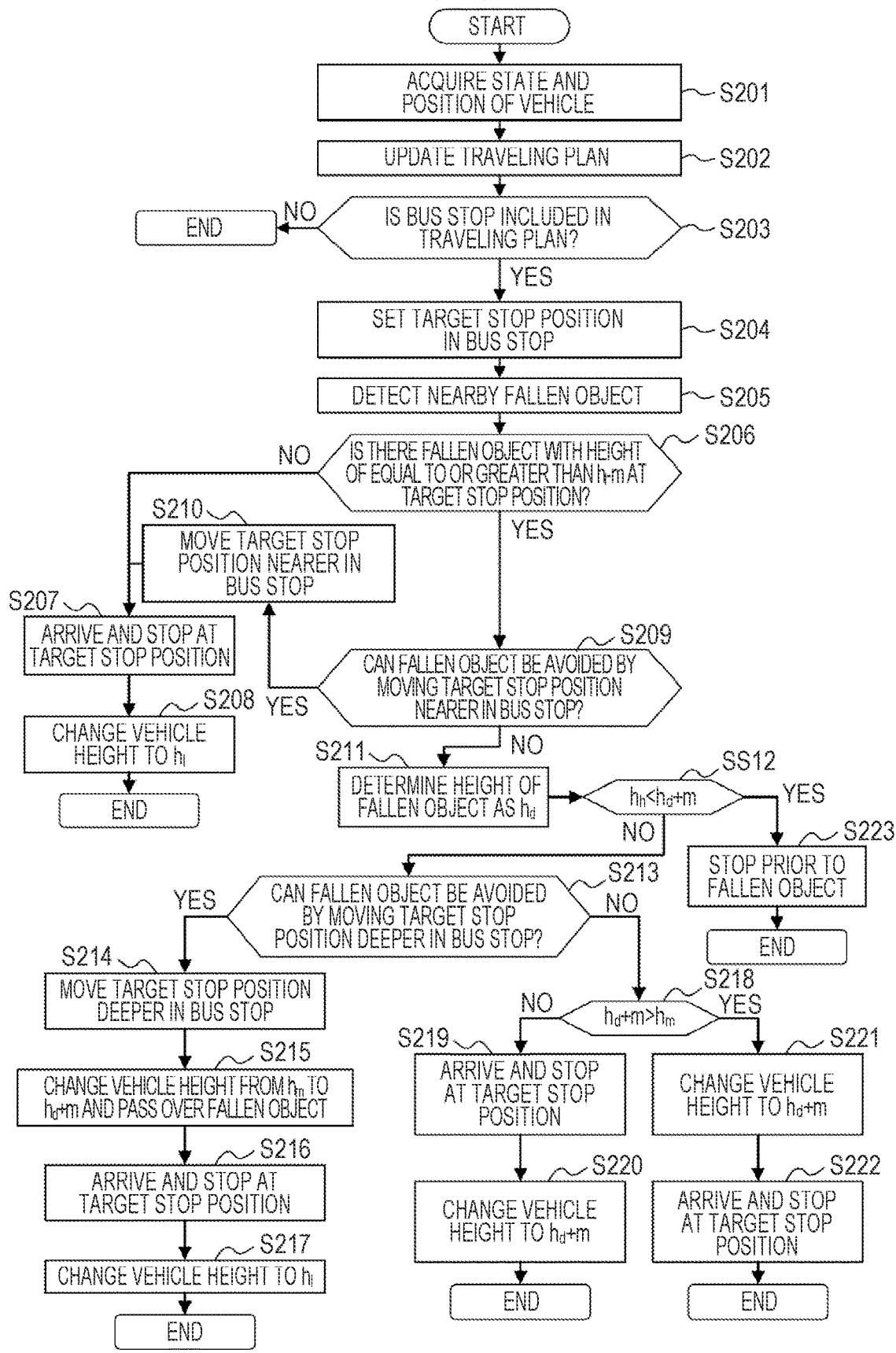

VEHICLE AND VEHICLE OPERATING METHOD

CROSS-REFERENCE TO RELATED APPLICATION

This application claims priority to Japanese Patent Application No. 2020-204493 filed on Dec. 9, 2020, incorporated herein by reference in its entirety.

BACKGROUND

1. Technical Field

The disclosure relates to a vehicle and a vehicle operating method. The disclosure is used for an autonomous driving vehicle including a vehicle height adjusting device configured to adjust a vehicle height at the time of stopping. The disclosure is used, for example, for an autonomous driving method of automatically operating an autonomous driving vehicle including the vehicle height adjusting device.

2. Description of Related Art

As disclosed in Japanese Unexamined Patent Application Publication No. 09-039539 (JP 09-039539 A), a vehicle including a vehicle height adjusting device that adjusts a vehicle height such that an occupant can easily enter and exit a vehicle when the vehicle stops is known.

SUMMARY

An obstacle such as a fallen object may be present at a position at which a vehicle is to stop. In this case, when a vehicle height is decreased, the obstacle may interfere with the vehicle and damage the vehicle.

The disclosure provides a vehicle and a vehicle operating method in which a vehicle can be allowed to stop such that an occupant can easily enter or exit the vehicle while preventing interference between the vehicle and an obstacle when the obstacle is present at a stop position of the vehicle.

A first aspect of the disclosure provides a vehicle. The vehicle includes an outside sensor configured to acquire information on an outside circumstance of the vehicle, a vehicle height adjusting device configured to adjust a vehicle height, and a control device configured to control the vehicle. The control device is configured to control the vehicle height adjusting device such that the vehicle height becomes a vehicle height corresponding to a platform condition at a predetermined stop position when the vehicle stops at the predetermined stop position. The control device is configured to control the vehicle height adjusting device based on a height of an obstacle such that the obstacle does not interfere with the vehicle when the obstacle is detected at the predetermined stop position by the outside sensor.

According to the first aspect, when an obstacle is present at a predetermined stop position at which the vehicle is scheduled to stop, the vehicle height is adjusted such that the obstacle does not interfere with the vehicle. Accordingly, it is possible to allow the vehicle to stop at the predetermined stop position such that an occupant can easily enter or exit the vehicle while preventing interference between the vehicle and the obstacle.

In the first aspect, the control device may be configured to change a stop position of the vehicle from the predetermined stop position to a position within an allowable area for stopping when a height of the obstacle is equal to or greater than a predetermined upper limit value. The position is a position at which the vehicle does not interfere with the obstacle. The control device may be configured to control the vehicle height adjusting device such that the vehicle height becomes a vehicle height corresponding to a platform condition at the changed stop position.

With this configuration, an occupant enters or exit the vehicle at a position which is different from the predetermined stop position, and the vehicle height is adjusted to a height corresponding to the platform condition at the changed stop position. Accordingly, it is possible to provide comfortable entrance and exit to the occupant.

In the first aspect, the control device may be configured to identify a type of the obstacle based on information acquired from the outside sensor. The control device may be configured to stop the vehicle at the predetermined stop position when the obstacle is an object that does not cause any problems about interference with the vehicle. The control device may be configured to control the vehicle height adjusting device such that the vehicle height becomes a vehicle height corresponding to a platform condition at the predetermined stop position.

With this configuration, it is not necessary to intentionally avoid an obstacle depending on the type of the obstacle and it is possible to provide comfortable entrance or exit to an occupant at the original position at which the occupant is to enter or exit the vehicle.

In the first aspect, the vehicle may further include a communication interface configured to communicate with an operator. The control device may be configured to provide an image of the obstacle to the operator and acquire information on the type of the obstacle from the operator when the type of the obstacle is not identified.

With this configuration, it is possible to accurately determine the type of the obstacle through support from the operator.

In the first aspect, the vehicle may further include an interface configured to communicate with an operator. The control device may be configured to request the operator for support and to operate the vehicle in accordance with an instruction from the operator when the vehicle is not able to stop within the allowable area for stopping without interfering with the obstacle.

With this configuration, in a situation with which the autonomous driving vehicle cannot cope, since support from an operator is provided, it is possible to prevent the vehicle from becoming stuck before an obstacle.

In the first aspect, the vehicle may be an autonomous driving vehicle.

A second aspect of the disclosure provides a vehicle operating method for operating a vehicle including a vehicle height adjusting device. The vehicle operating method includes controlling the vehicle height adjusting device such that a vehicle height of the vehicle becomes a vehicle height corresponding to a platform condition at a predetermined stop position when the vehicle stops at the predetermined stop position. The vehicle operating method includes controlling the vehicle height adjusting device based on a height of an obstacle such that the obstacle does not interfere with the vehicle when the obstacle is present at the predetermined stop position.

In the second aspect, the vehicle may be an autonomous driving vehicle and the vehicle operating method may be performed to allow the autonomous driving vehicle to travel autonomously.

As described above, according to the first aspect and the second aspect of the disclosure, when an obstacle is present at a predetermined stop position, a vehicle height is adjusted such that the obstacle and the vehicle do not interfere with each other. Accordingly, it is possible to allow a vehicle to stop at the predetermined stop position such that an occupant can easily enter or exit the vehicle while preventing interference between the vehicle and the obstacle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram illustrating a configuration of an autonomous driving vehicle according to the first embodiment of the disclosure;

FIG. 5 is a flowchart illustrating a routine of vehicle control at the time of stopping according to the second embodiment of the disclosure;

DETAILED DESCRIPTION OF EMBODIMENTS

Figure 1A:
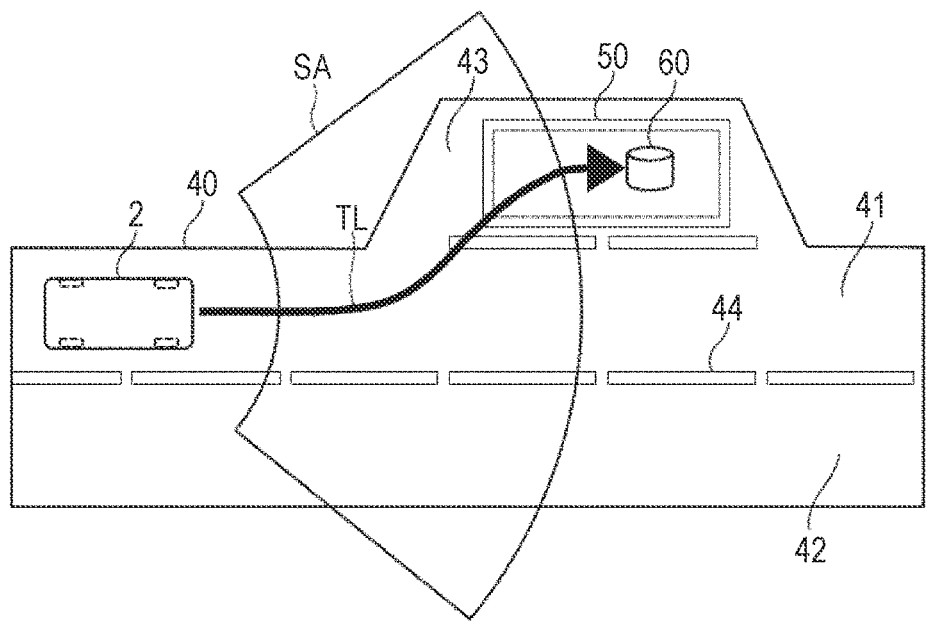
FIG. 1A is a diagram illustrating an outline of a first embodiment of the disclosure.

In embodiments described below, the same elements in the drawings will be referred to by the same reference signs and description thereof will not be repeated or simplified. When numerical values such as the number of elements, quantities, volumes, or ranges are mentioned in the following embodiments, the disclosure is not limited to the mentioned numerical values unless otherwise mentioned or unless the numerical values are apparently defined in principle.

1. First Embodiment 1-1. Outline

An outline of a first embodiment will be first described below with reference to FIGS. 1A and 1B.

FIG. 1A illustrates a situation in which a bus 2 travels on a two-lane road 40 in which a traveling lane 41 and an overtaking lane 42 are partitioned by a lane boundary line 44. In the following description, the bus 2 is simply referred to as a vehicle 2. A bus bay 43 is provided outside of the traveling lane 41. In the bus bay 43, a stoppable area 50 in which stopping of a vehicle 2 is possible is drawn by a rectangular frame. It is assumed that stopping of a vehicle 2 is allowed in only the stoppable area 50 in principle. In the following description, the stoppable area 50 in which a vehicle 2 can stop is referred to as a bus stop 50.

The vehicle 2 is an autonomous driving vehicle that can travel autonomously. The vehicle 2 travels along a trajectory TL which is generated based on a target route while sensing a sensing area SA in front of the vehicle 2 in a traveling direction using an outside sensor which will be described later. The trajectory TL is a locus along which the vehicle 2 travels in the target route. When an obstacle in front of the vehicle 2 is detected through sensing, the trajectory TL is generated such that the vehicle 2 avoids the obstacle. In the examples illustrated in FIGS. 1A and 1B, the vehicle 2 is traveling in the traveling lane 41 along the trajectory TL extending from the traveling lane 41 to the bus bay 43. The trajectory TL is generated such that the vehicle 2 stops in the bus stop 50.

Basically, the vehicle 2 stops at a predetermined stop position at which the vehicle has drawn near a station platform on which occupants are waiting. When the vehicle 2 stops, a ground clearance, that is, a vehicle height, is adjusted according to entrance/exit conditions at the predetermined stop position such that the occupant can easily enter the vehicle. Specifically, the vehicle height is adjusted according to a height of the station platform. When the station platform is low or when the bus stop does not include a platform and a floor thereof is flush with a road surface of the bus stop 50, the vehicle height of the vehicle 2 is decreased to a lowest position. For example, an air suspension system or a lifter system can be used as a vehicle height adjusting device that adjusts a vehicle height.

Detection of an obstacle in front of the vehicle 2 in the traveling direction and avoidance of an obstacle are also performed in the bus stop 50. A fallen object 60 may have fallen in the bus stop 50 from time to time. The fallen object 60 may be possessions lost by an occupant or luggage fallen from another vehicle. The fallen object 60 in the bus stop 50 serves as an obstacle for a vehicle 2 stopping in the bus stop 50.

However, when a trajectory TL is generated such that it avoids the fallen object 60, the vehicle 2 cannot be stopped in the bus stop 50. When the vehicle 2 cannot be stopped in the bus stop 50, an occupant in the vehicle 2 cannot exit the vehicle 2 and an occupant in the station platform cannot enter the vehicle 2.

Figure 1B:
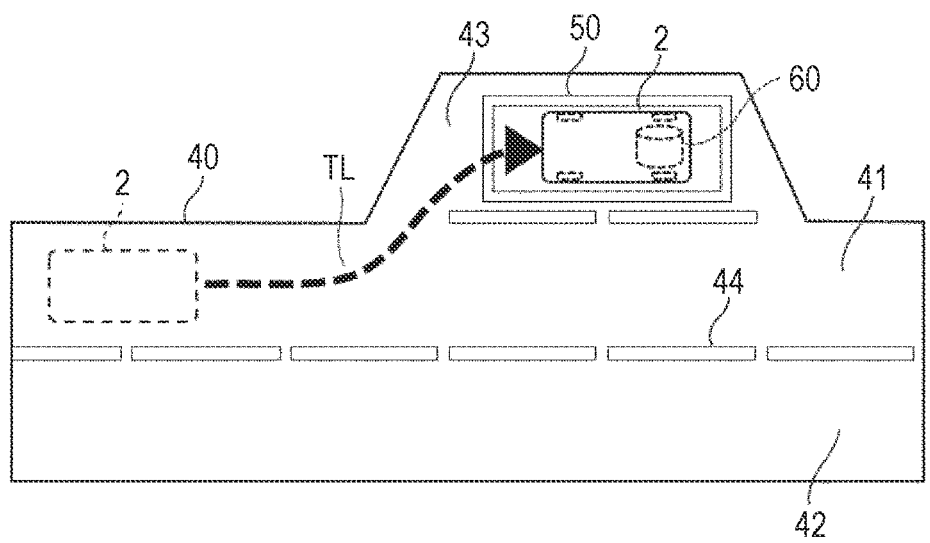
FIG. 1B is a diagram illustrating the outline of the first embodiment of the disclosure.

Therefore, in the first embodiment, instead of generating the trajectory TL to avoid the fallen object 60, the trajectory TL is generated such that the vehicle 2 is stopped at a predetermined stop position as illustrated in FIG. 1B. The vehicle 2 stops at the predetermined stop position in the bus stop 50 such that an occupant can easily enter or exit the vehicle while preventing interference between the vehicle 2 and the fallen object 60. Specifically, when the vehicle 2 is stopped at the predetermined stop position, the vehicle height is adjusted based on a height of the fallen object 60 such that the vehicle height is as low as possible in a range in which the bottom of the vehicle 2 does not interfere with the fallen object 60. Specifically, interference between the fallen object 60 and the bottom of the vehicle 2 means that the fallen object 60 comes into contact with the bottom of the vehicle 2 and the fallen object 60 is pressed by the bottom. The height of the fallen object 20 is estimated based on information acquired by sensing using an outside sensor.

1-2. Configuration of Autonomous Driving Vehicle

FIG. 2 is a block diagram illustrating a configuration of a vehicle 2 which is an autonomous driving vehicle according to the first embodiment. The configuration of a vehicle 2 illustrated in FIG. 2 is the same as those of autonomous driving vehicles according to second, third, fourth, and sixth embodiments which will be described later. The vehicle 2 includes a vehicle control device 10 that controls the vehicle 2, an onboard sensor that inputs information to the vehicle control device 10, and an actuator that operates in accordance with a signal output from the vehicle control device 10.

The onboard sensor includes a GPS receiver unit 6, an inside sensor 7, and an outside sensor 8. The GPS receiver unit 6 measures a current position (for example, latitude and longitude) of the vehicle 2 by receiving signals from GPS satellites. The inside sensor 7 is a sensor that detects a traveling state of the vehicle 2. The inside sensor 7 includes at least one of a vehicle speed sensor, an acceleration sensor, and a yaw rate sensor. The outside sensor 8 is a sensor that detects outside circumstances which are surroundings information of the vehicle 2. The outside sensor 8 includes at least one of a camera, a millimeter wave radar, and a LiDAR. Processes such as detection of an object near the vehicle 2, measuring of a position or a speed of the detected object relative to the vehicle 2, and recognition of a shape of the detected object are performed based on the information acquired from the outside sensor 8.

The actuator includes a traveling actuator 4 that is associated with traveling of the vehicle 2 and an air suspension system 5. Specifically the traveling actuator 4 includes a steering actuator that steers the vehicle 2, a drive actuator that drives the vehicle 2, and a brake actuator that brakes the vehicle 2. The air suspension system 5 is a suspension that includes an actuator which can extend with intake or discharge of air. The air suspension system 5 is provided for the purpose of improvement of ride comfort at the time of traveling of the vehicle 2 and adjustment of the vehicle height. With the air suspension system 5, the vehicle height of the vehicle 2, that is, the height from the ground surface GL to a bottom 3 of the vehicle 2, can be adjusted continuously or in a stepped manner in a range from a highest height $h_h$ to a lowest height $h_l$. The vehicle height at the time of traveling normally is adjusted to a vehicle height $h_m$ between the highest height $h_h$ and the lowest height $h_l$.

The vehicle control device 10 is an electronic control unit (ECU) including at least one processor 11 and at least one memory 12. The memory includes a main storage device and an auxiliary storage device. A program which can be executed by the processor 11 and various types of data associated therewith are stored in the memory 12. The program includes a program which is stored for vehicle control at the time of stopping which will be described later. By causing the processor 11 to execute a program stored in the memory 12, the vehicle control device 10 can realize various functions. The ECU constituting the vehicle control device 10 may be a group of a plurality of ECUs.

Data stored in the memory 12 includes map information. The map information is managed by a map database (a map DB) 21. The map information managed by the map DB 21 includes, for example, position information of roads, shape information of roads (for example, curves, types of straight portions, and curvatures of the curves), information of junctions of crossings, information on a target route on which a host vehicle is to travel, and information of road structures. The map DB 21 is stored in advance in an auxiliary storage device such as an SSD or an HDD. The map information may be downloaded from an external server via the Internet or the map information in an external server may be referred to.

The vehicle control device 10 includes a vehicle state and position estimating unit 22, an obstacle detecting unit 23, a traveling plan creating unit 24, a travel control unit 25, a vehicle height control determining unit 26, and a vehicle height control unit 27 as constituents associated with vehicle control at the time of stopping. These constituents are realized as functions of the vehicle control device 10 when a program stored in the memory 12 is executed by the processor 11.

The vehicle state and position estimating unit 22 recognizes a traveling state of the vehicle 2 based on a result of detection from the inside sensor 7. The result of detection from the inside sensor 7 which is acquired by the vehicle state and position estimating unit 22 includes, for example, vehicle speed information from the vehicle speed sensor, acceleration information from the acceleration sensor, and yaw rate information from the yaw rate sensor. The vehicle state and position estimating unit 22 estimates a position of the vehicle on a map based on the position information of the vehicle 2 received by the GPS receiver unit 6 and the map information in the map DB 21.

The obstacle detecting unit 23 detects an obstacle which is present in a sensing area SA which is set in front of the vehicle 2 in the traveling direction outside the vehicle 2 using sensor data from the outside sensor 8 and the map DB 21. Examples of an obstacle detected by the obstacle detecting unit 23 include a vehicle, a motorbike, a pedestrian, an animal, and a fallen object.

The traveling plan creating unit 24 generates a trajectory TL of the vehicle 2, for example, based on a target route recorded on the map DB 21, the state and the position of the vehicle 2 recognized by the vehicle state and position estimating unit 22, and an obstacle outside the vehicle 2 detected by the obstacle detecting unit 23. The traveling plan creating unit 24 generates the trajectory TL such that the vehicle 2 can travel appropriately on the target route in view of safety, observation of rules, and references such as travel efficiency.

The traveling plan creating unit 24 creates a traveling plan corresponding to the generated trajectory TL. That is, the traveling plan creating unit 24 creates a traveling plan corresponding to a preset target route based on at least obstacle information which is surroundings information of the vehicle 2 and the map information of the map DB 21. In some embodiments, the traveling plan creating unit 24 outputs the created traveling plan in which the trajectory TL of the vehicle includes a plurality of groups including two elements of a target position p in a coordinate system fixed to the vehicle 2 and a speed v at each target point, that is, a plurality of configuration coordinates (p, v). Here, each target position p includes at least x and y coordinates in the coordinate system fixed to the vehicle or information equivalent thereto.

The traveling plan creating unit 24 constitutes an autonomous driving system 28 along with the vehicle height control determining unit 26 which will be described later and shares the traveling plan of the vehicle 2 and obstacle information with the vehicle height control determining unit 26. When an obstacle interfering with the traveling plan of the vehicle 2 is detected by the obstacle detecting unit 23, a collision avoidance method which can be employed is one of a collision avoiding method using steering or deceleration and a collision avoiding method by adjusting the vehicle height. As will be described later, the vehicle height control determining unit 26 determines whether an obstacle can be avoided by adjusting the vehicle height. When the vehicle height control determining unit 26 determines that the obstacle cannot be avoided through vehicle height control, the traveling plan creating unit 24 updates the traveling plan and avoids a collision with the obstacle through steering or deceleration.

The travel control unit 25 automatically controls travel of the vehicle 2 based on the traveling plan created by the traveling plan creating unit 24. The travel control unit 25 outputs a control signal based on the traveling plan to the traveling actuator 4. Accordingly, the travel control unit 25 controls travel of the vehicle 2 such that the vehicle 2 travels autonomously in accordance with the traveling plan.

The vehicle height control determining unit 26 determines whether there is an obstacle interfering with the traveling plan of the vehicle 2 created by the traveling plan creating unit 24 using information of the obstacle detected by the obstacle detecting unit 23. When there is an obstacle interfering with the traveling plan, the vehicle height control determining unit 26 determines whether the obstacle can be avoided through vehicle height control of the vehicle 2. This determination is performed, for example, using information such as a position of the obstacle, a height of the obstacle, and an interference position with the vehicle 2 if the vehicle 2 were to pass over the obstacle as in the traveling plan. When the obstacle can be avoided, the vehicle height control determining unit 26 sends a vehicle height control value to the vehicle height control unit 27. When the obstacle cannot be avoided, the vehicle height control determining unit 26 notifies the traveling plan creating unit 24 that the obstacle cannot be avoided through the vehicle height control.

The vehicle height control determining unit 26 also determines whether the vehicle height can be decreased at the time of stopping at an arbitrary position described in the map DB 21. A position at which the vehicle height is to be decreased is registered in the map DB 21 in advance. A representative example of the position at which the vehicle height is to be decreased is a bus stop 50. The position at which the vehicle height is to be decreased is not limited to a bus stop 50, but it is assumed that the position at which the vehicle height is to be decreased is the bus stop 50 as described above in the outline of the first embodiment.

When a bus stop is included in a traveling plan immediately previously created by the traveling plan creating unit 24, the vehicle height control determining unit 26 determines whether an obstacle is present near the bus stop 50. An obstacle of interest is mainly a fallen object 60 as described above in the outline of the first embodiment. The obstacle is not limited to a fallen object 60, but it is assumed herein that the obstacle is a fallen object 60.

When a fallen object 60 is not present in the bus stop 50, the vehicle height control determining unit 26 sends a vehicle height control value to the vehicle height control unit 27 such that the vehicle height can be decreased at the time of stopping in the bus stop 50. The vehicle height control value may be, for example, a vehicle height itself, a change in vehicle height from the vehicle height $h_m$ at the time of normal traveling, or an actuator extension of the air suspension system 5. The vehicle height when a fallen object 60 is not present in the bus stop 50 depends on the height of the station platform, and the lowest vehicle height $h_l$ is normally selected.

When a fallen object 60 is present in the bus stop 50, the vehicle height control determining unit 26 determines whether the fallen object 60 can be avoided through the vehicle height control. When the fallen object 60 can be avoided through the vehicle height control, the vehicle height control determining unit 26 sends a vehicle height control value for avoidance to the vehicle height control unit 27. As the vehicle height in this case, a vehicle height as close as possible to the height of the platform is selected as long as interference between the fallen object 60 and the bottom 3 of the vehicle 2 can be avoided. Therefore, depending on a positional relationship between the fallen object 60 and the vehicle 2 at the time of stopping and the height of the fallen object 60, the vehicle height at the timing of stopping may be decreased to lower than the vehicle height $h_m$ at the time of traveling normally or may be increased to higher than the vehicle height $h_m$ at the time of traveling normally.

On the other hand, in the vehicle height control, when a fallen object 60 cannot be avoided, the vehicle height control determining unit 26 notifies the traveling plan creating unit 24 that the fallen object cannot be avoided through the vehicle height control. Since a position of a bus stop 50 is registered in the map DB 21 in advance, it is possible to detect an obstacle which is present in the bus stop 50 using the outside sensor 8 and to determine whether to perform avoidance based on vehicle height control before the vehicle arrives at the bus stop 50.

The vehicle height control unit 27 controls the air suspension system 5 which is a vehicle height adjusting device based on a vehicle height control value which is received from the vehicle height control determining unit 26. Specifically, the vehicle height control unit 27 controls the actuator of the air suspension system 5 such that the vehicle height is adjusted based on the vehicle height control value.

1-3. Vehicle Control at the Time of Stopping

Figure 3:
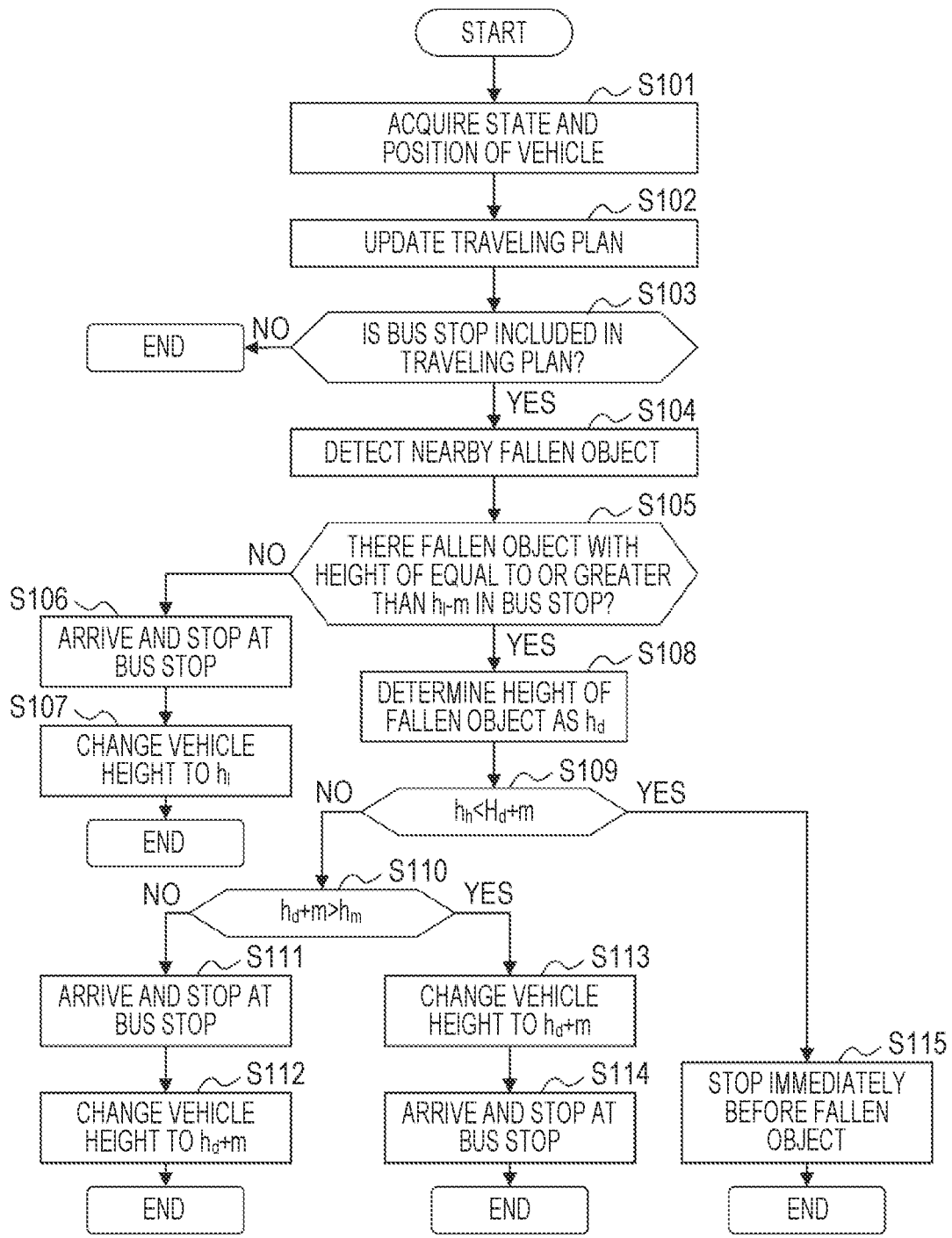
FIG. 3 is a flowchart illustrating a routine of vehicle control at the time of stopping according to the first embodiment of the disclosure.

Details of vehicle control at the time of stopping according to the first embodiment will be described below with reference to FIG. 3. FIG. 3 is a flowchart illustrating a routine of vehicle control which is performed by the vehicle control device 10 when a vehicle 2 stops at a bus stop 50. For the purpose of simplification of description, it is assumed that the number of fallen objects 60 which have fallen in the bus stop 50 is one. This assumption is also applied to the embodiments which will be described later. In the flowchart, $h_h$ represents a highest vehicle height which can be adjusted through the vehicle height control, $h_m$ represents a vehicle height at the time of traveling normally, $h_l$ represents a lowest vehicle height which can be adjusted through the vehicle height control, and m ($\geq 0$) represents a height of a gap which is to be secured between the fallen object 60 and the bottom 3 of the vehicle 2. These definitions are applied to other embodiments which will be described later.

In the flowchart illustrated in FIG. 3, first, the vehicle control device 10 acquires a state and a position of a vehicle 2 (Step S101) and updates a traveling plan (Step S102). Then, the vehicle control device 10 determines whether a bus stop 50 is included in the traveling plan (Step S103). When a bus stop 50 is not included, the vehicle control at the time of stopping ends.

When a bus stop 50 is included, the vehicle control device 10 detects a nearby fallen object using the outside sensor 8 (Step S104). Based on a result of detection, the vehicle control device 10 determines whether there is a fallen object with a height of equal to or greater than $h_l$–m in the bus stop 50 (Step S105). When there is not such a fallen object, the vehicle control device 10 causes the vehicle 2 to arrive at the bus stop 50 and to stop at a predetermined stop position (Step S106). Then, the vehicle control device 10 changes the vehicle height from $h_m$ to $h_l$ such that an occupant can easily enter or exit the vehicle (Step S107).

When a fallen object 60 with a height of equal to or greater than $h_l$–m is present in the bus stop 50, the height of the fallen object 60 is stored in a parameter $h_d$ (Step S108). The vehicle control device 10 determines whether $h_d$ and $h_h$ satisfy Relational Expression (1) (Step S109).

$$h_h < h_d + m \qquad (1)$$

Relational Expression (1) is an expression which is used to determine whether interference with the fallen object 60 can be avoided through the vehicle height control. When Relational Expression (1) is satisfied, interference with the fallen object 60 cannot be avoided even if the vehicle height is increased to the highest height through the vehicle height control. However, when Relational Expression (1) is not satisfied, interference with the fallen object 60 can be avoided.

When Relational Expression (1) is not satisfied, the vehicle control device 10 determines whether $h_d$ and $h_m$ satisfy Relational Expression (2) (Step S110).

$$h_d + m > h_m \qquad (2)$$

Relational Expression (2) is an expression which is used to determine whether interference with the fallen object 60 can be avoided with the vehicle height at the time of traveling normally. When Relational Expression (2) is satisfied, interference with the fallen object 60 cannot be avoided with the vehicle height at the time of traveling normally. However, when Relational Expression (2) is not satisfied, interference with the fallen object 60 can be avoided with the vehicle height at the time of traveling normally.

When Relational Expression (1) is not satisfied and Relational Expression (2) is not satisfied, the vehicle control device 10 causes the vehicle 2 to arrive at the bus stop 50 and causes the vehicle 2 to stop at a predetermined stop position (Step S111). Then, the vehicle control device 10 changes the vehicle height from $h_m$ to $h_d$+m (Step S112). In this case, the vehicle height cannot be decreased to $h_l$, but since the changed vehicle height $h_d$+m is lower than the non-changed vehicle height $h_m$, entrance and exit properties are improved by at least the decrease of the vehicle height.

When Relational Expression (1) is not satisfied and Relational Expression (2) is satisfied, first, the vehicle control device 10 changes the vehicle height from $h_m$ to $h_d$+m (Step S113). Then, the vehicle control device 10 causes the vehicle 2 to arrive at the bus stop 50 and causes the vehicle 2 to stop at a predetermined stop position while maintaining the vehicle height at $h_d$+m (Step S114). In this case, the changed vehicle height $h_d$+m is higher than the non-changed vehicle height $h_m$ and the vehicle 2 can be stopped at the predetermined stop position such that an occupant can easily enter or exit the vehicle.

When Relational Expression (1) is satisfied, the vehicle control device 10 causes the vehicle 2 to stop immediately before the fallen object 60 (Step S115). In this case, the vehicle control device 10 may request an occupant or a person near the vehicle 2 to give a hand and to remove the fallen object 60 in front of the vehicle 2. A method of requesting an operator for a support operation can also be considered, which will be described later in another embodiment.

When the vehicle 2 stops at the bus stop 50, it is possible to cause the vehicle 2 to stop at a predetermined stop position such that an occupant can easily enter or exit the vehicle while preventing interference between the vehicle 2 and the fallen object 60 by allowing the vehicle control device 10 to perform the vehicle control according to the aforementioned routine.

2. Second Embodiment 2-1. Outline

An outline of a second embodiment will be described below with reference to FIGS. 4A, 4B, and 4C.

Figure 4A:
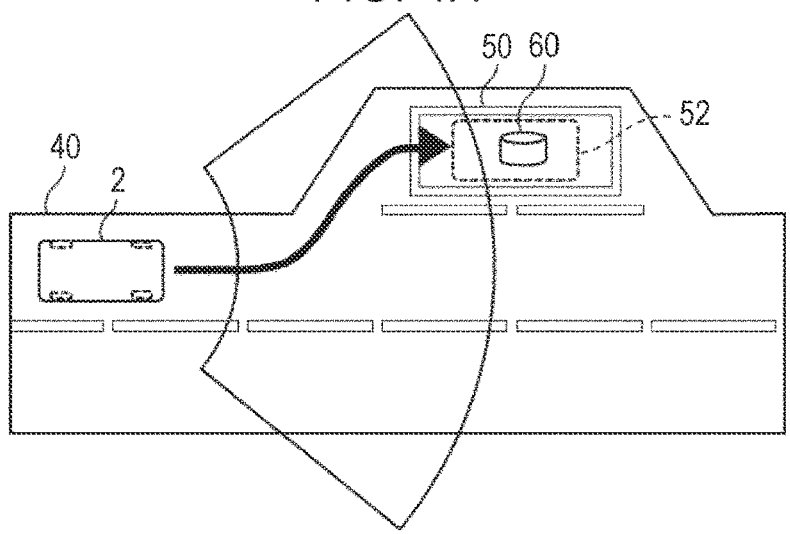
FIG. 4A is a diagram illustrating an outline of a second embodiment of the disclosure.

In the first embodiment, as illustrated in FIG. 4A, the vehicle 2 is caused to stop at the predetermined stop position 52 in the bus stop 50 and the vehicle height thereof is adjusted such that the vehicle 2 does not interfere with the fallen object 60. However, depending on the position of the fallen object 60, the vehicle height can be decreased to the lowest height without causing interference with the fallen object 60 by displacing the stop position of the vehicle 2 from the predetermined stop position 52. Therefore, in the second embodiment, the stop position of the vehicle 2 in the bus stop 50 is changed depending on the position of the fallen object 60 and the vehicle height is adjusted to a vehicle height corresponding to entrance/exit conditions at the changed stop position such that an occupant can easily enter or exit the vehicle.

Figure 4B:
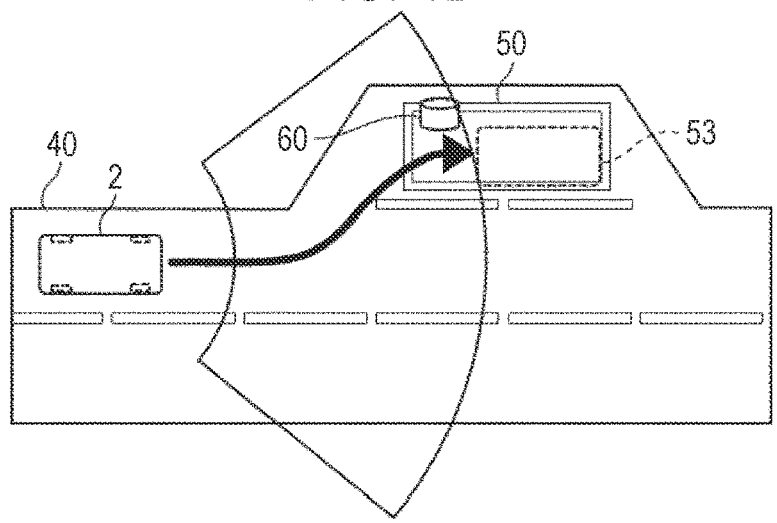
FIG. 4B is a diagram illustrating the outline of the second embodiment of the disclosure.

For example, as illustrated in FIG. 4B, a fallen object 60 may be present nearer in the bus stop 50. In this case, in the second embodiment, when the height of the fallen object 60 is a height over which the vehicle 2 can travel through the vehicle height control, a stop position 53 is changed to be deeper than the predetermined stop position 52. The vehicle 2 moves to the stop position 53 deeper in the bus stop 50 over the fallen object 60 and decreases the vehicle height at the stop position 53. At the stop position 53, the vehicle height can be decreased to the lowest vehicle height.

Figure 4C:
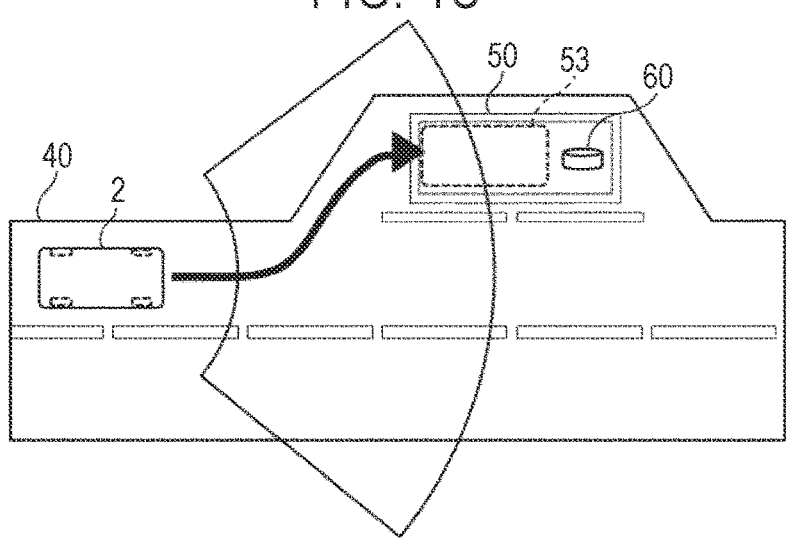
FIG. 4C is a diagram illustrating the outline of the second embodiment of the disclosure.

As illustrated in FIG. 4C, a fallen object 60 may be located deeper in the bus stop 50. In this case, in the second embodiment, the stop position 53 is changed nearer than the predetermined stop position 52. The stop position 53 is nearer position than the fallen object 60. The vehicle 2 moves to the stop position 53 and decreases the vehicle height at the stop position 53. At the stop position 53, the vehicle height can be decreased to the lowest vehicle height.

2-2. Vehicle Control at the Time of Stopping

Details of vehicle control at the time of stopping according to the second embodiment will be described below with reference to FIG. 5. FIG. 5 is a flowchart illustrating a routine of vehicle control which is performed by the vehicle control device 10 when a vehicle 2 stops at a bus stop 50.

In the flowchart illustrated in FIG. 5, first, the vehicle control device 10 acquires a state and a position of a vehicle 2 (Step S201) and updates a traveling plan (Step S202).

Then, the vehicle control device 10 determines whether a bus stop 50 is included in the traveling plan (Step S203). When a bus stop 50 is not included, the vehicle control at the time of stopping ends.

When a bus stop 50 is included, the vehicle control device 10 sets a target stop position in the bus stop 50 (Step S204). The target stop position which is first set is a predetermined stop position 52 at which an occupant can most easily enter or exit the vehicle. The vehicle control device 10 detects a nearby fallen object using the outside sensor 8 (Step S205). Based on a result of detection, the vehicle control device 10 determines whether there is a fallen object with a height of equal to or greater than $h_l-m$ at the target stop position (Step S206). When there is not such a fallen object, the vehicle control device 10 causes the vehicle 2 to arrive at the target stop position and to stop at that position (Step S207). Then, the vehicle control device 10 changes the vehicle height from $h_m$ to $h_l$ such that an occupant can easily enter or exit the vehicle (Step S208).

When a fallen object 60 with a height of equal to or greater than $h_l-m$ is present at the target stop position, the vehicle control device 10 determines whether the fallen object 60 can be avoided by moving the target stop position nearer in the bus stop 50 (Step S209). That is, the vehicle control device 10 determines whether this case is the case illustrated in FIG. 4C. When this case corresponds to the case illustrated in FIG. 4C, the vehicle control device 10 moves the target stop position to a position at which the fallen object 60 can be avoided nearer in the bus stop 50 (Step S210). Then, the vehicle control device 10 causes the vehicle 2 to arrive at the changed target stop position and causes the vehicle 2 to stop at that position (Step S207) and changes the vehicle height from $h_m$ to $h_l$ (Step S208).

When this case does not correspond to the case illustrated in FIG. 4C, the height of the fallen object 60 is stored in the parameter $h_d$ (Step S211). The vehicle control device 10 determines whether $h_d$ and $h_h$ satisfy Relational Expression (1) (Step S212). When Relational Expression (1) is satisfied, the vehicle control device 10 causes the vehicle 2 to stop immediately before the fallen object 60 (Step S223).

When Relational Expression (1) is not satisfied, the vehicle control device 10 determines whether the fallen object 60 can be avoided by moving the target stop position deeper in the bus stop 50 (Step S213). That is, the vehicle control device 10 determines whether this case corresponds to the case illustrated in FIG. 4B. When this case corresponds to the case illustrated in FIG. 4B, the vehicle control device 10 moves the target stop position to a position at which the fallen object 60 can be avoided deeper in the bus stop 50 (Step S214). Then, the vehicle control device 10 changes the vehicle height to the larger value of $h_m$ and $h_d+m$ and causes the vehicle 2 to pass over the fallen object 60 (Step S215). Then, the vehicle control device 10 causes the vehicle 2 to arrive at the changed target stop position and causes the vehicle 2 to stop at that position (Step S216), and changes the vehicle height from $h_m$ or $h_d+m$ to $h_l$ (Step S217).

When this case does not correspond to the case illustrated in FIG. 4B, the vehicle control device 10 determines whether $h_d$ and $h_m$ satisfy Relational Expression (2) (Step S218).

When Relational Expression (2) is not satisfied, the vehicle control device 10 causes the vehicle 2 to arrive at the original target stop position and causes the vehicle 2 to stop at that position (Step S219). Then, the vehicle control device 10 changes the vehicle height from $h_m$ to $h_d+m$ (Step S220). On the other hand, when Relational Expression (2) is satisfied, first, the vehicle control device 10 changes the vehicle height from $h_m$ to $h_d+m$ (Step S221). Then, the vehicle control device 10 causes the vehicle 2 to arrive at the original target stop position and causes the vehicle 2 to stop at that position while maintaining the vehicle height at $h_d+m$ (Step S222).

When the vehicle 2 stops at the bus stop 50, an occupant enters or exits the vehicle at a position different from the predetermined stop position 52 by allowing the vehicle control device 10 to perform the vehicle control according to the aforementioned routine. However, since the vehicle height is adjusted to a vehicle height corresponding to entrance/exit conditions at the changed stop position 53, it is possible to provide comfortable entrance or exit to the occupant while preventing interference between the vehicle 2 and the fallen object 60.

3. Third Embodiment

3-1. Outline

An outline of a third embodiment will be described below with reference to FIGS. 6A, 6B, and 6C.

Figure 6A:
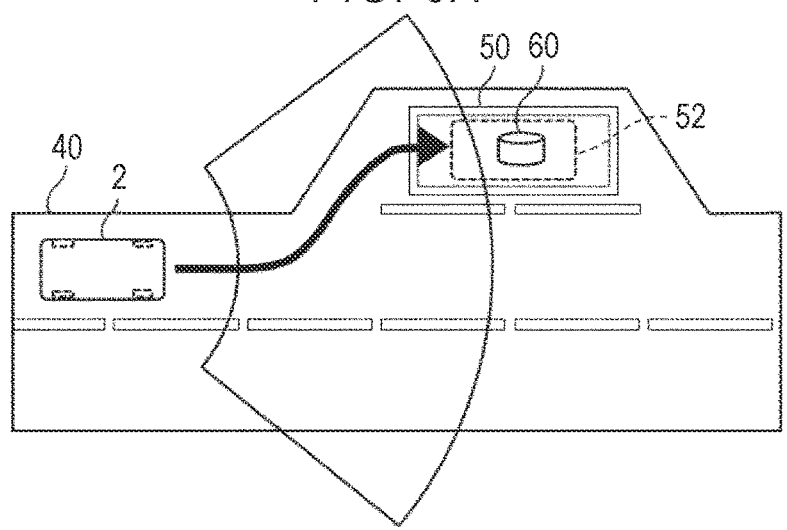
FIG. 6A is a diagram illustrating an outline of a third embodiment of the disclosure.

In the first embodiment, as illustrated in FIG. 6A, the vehicle 2 is caused to stop at the predetermined stop position 52 in the bus stop 50 and the vehicle height thereof is adjusted such that the vehicle 2 does not interfere with the fallen object 60. In the third embodiment, similarly to the second embodiment, the stop position of the vehicle 2 in the bus stop 50 is changed depending on a position of a fallen object 60 and the vehicle height is adjusted to a vehicle height corresponding to entrance/exit conditions at the changed stop position such that an occupant can easily enter or exit the vehicle. In the second embodiment, the stop position of the vehicle 2 is moved deeper or nearer from the predetermined stop position 52. However, in the third embodiment, the stop position of the vehicle 2 is moved rightwards or leftwards from the predetermined stop position 52.

Figure 6B:
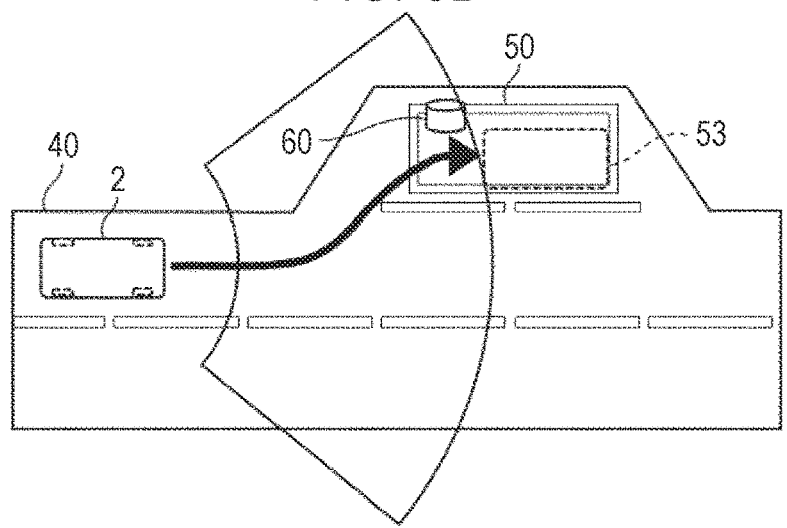
FIG. 6B is a diagram illustrating the outline of the third embodiment of the disclosure.

For example, as illustrated in FIG. 6B, a fallen object 60 may be present on the left side of the bus stop 50. In this case, in the third embodiment, the stop position 53 is changed to the right side from the predetermined stop position 52. The stop position 53 is also a position on the right side from the fallen object 60. The vehicle 2 moves to the stop position 53 and decreases the vehicle height at the stop position 53. At the stop position 53, the vehicle height can be decreased to the lowest vehicle height.

Figure 6C:
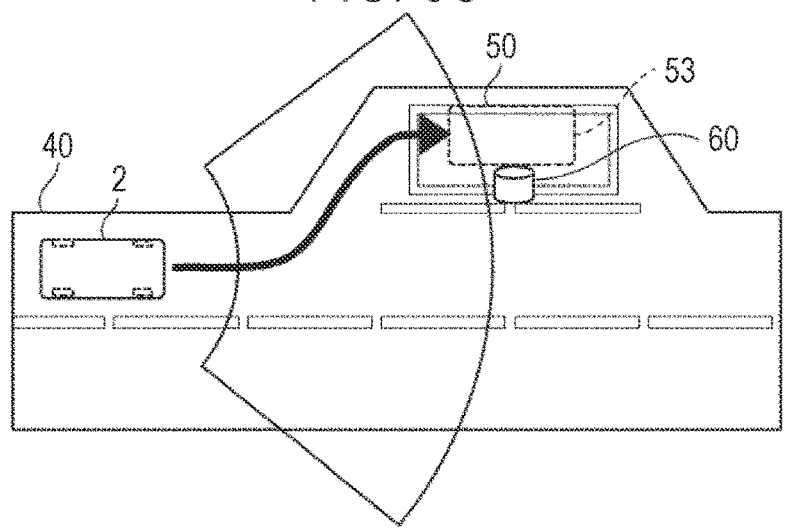
FIG. 6C is a diagram illustrating the outline of the third embodiment of the disclosure.

For example, as illustrated in FIG. 6C, a fallen object 60 may be present on the right side of the bus stop 50. In this case, in the third embodiment, the stop position 53 is changed to the left side from the predetermined stop position 52. The stop position 53 is also a position on the left side from the fallen object 60. The vehicle 2 moves to the stop position 53 and decreases the vehicle height at the stop position 53. At the stop position 53, the vehicle height can be decreased to the lowest vehicle height.

3-2. Vehicle Control at the Time of Stopping

Figure 7:
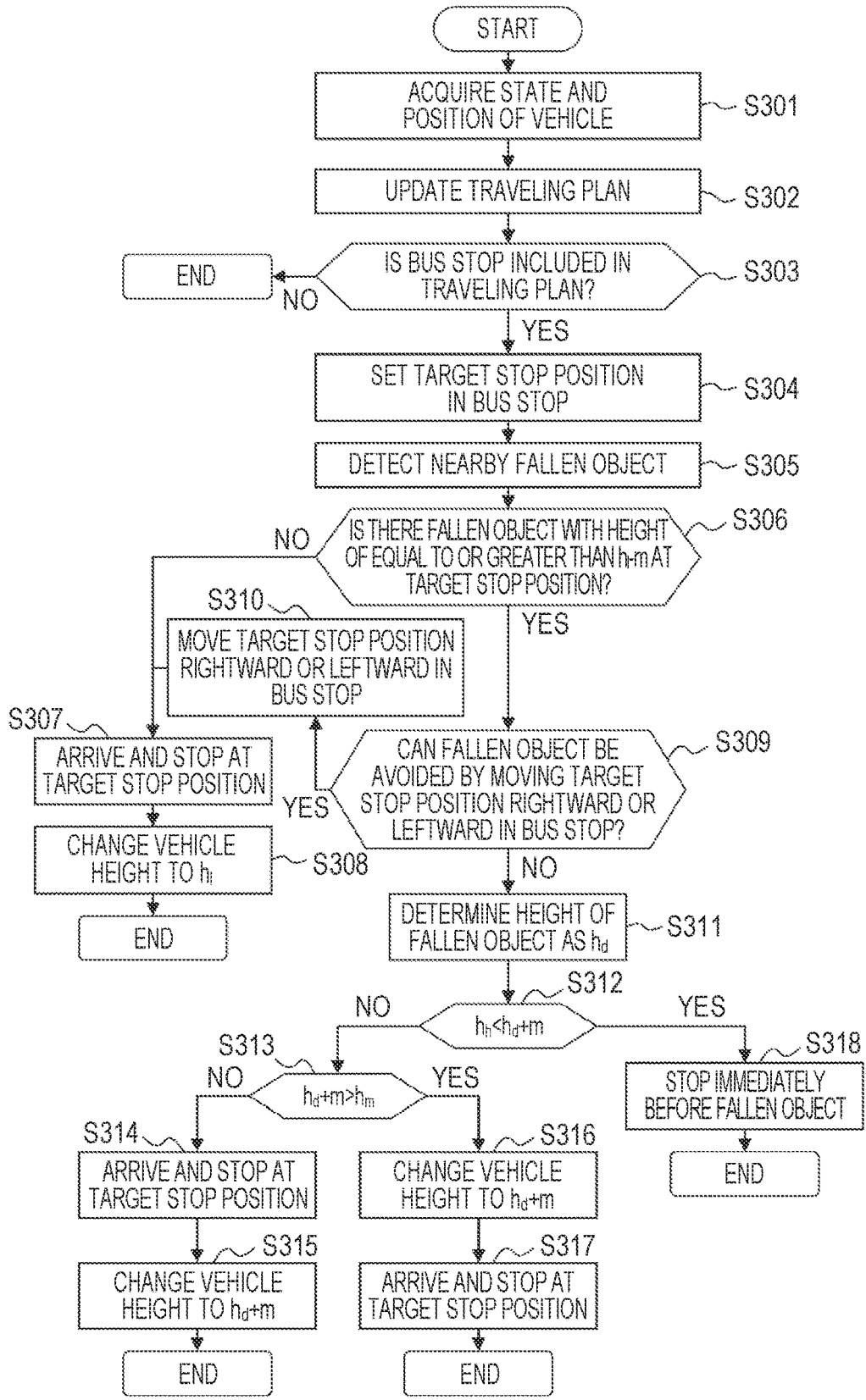
FIG. 7 is a flowchart illustrating a routine of vehicle control at the time of stopping according to the third embodiment of the disclosure.

Details of vehicle control at the time of stopping according to the third embodiment will be described below with reference to FIG. 7. FIG. 7 is a flowchart illustrating a routine of vehicle control which is performed by the vehicle control device 10 when a vehicle 2 stops at a bus stop 50.

In the flowchart illustrated in FIG. 7, first, the vehicle control device 10 acquires a state and a position of a vehicle 2 (Step S301) and updates a traveling plan (Step S302). Then, the vehicle control device 10 determines whether a bus stop 50 is included in the traveling plan (Step S303). When a bus stop 50 is not included, the vehicle control at the time of stopping ends.

When a bus stop 50 is included, the vehicle control device 10 sets a target stop position in the bus stop 50 (Step S304). The vehicle control device 10 detects a nearby fallen object using the outside sensor 8 (Step S305). Based on a result of detection, the vehicle control device 10 determines whether there is a fallen object with a height of equal to or greater than $h_l-m$ at the target stop position (Step S306). When there is not such a fallen object, the vehicle control device 10 causes the vehicle 2 to arrive at the target stop position and to stop at that position (Step S307). Then, the vehicle control device 10 changes the vehicle height from $h_m$ to $h_l$ such that an occupant can easily enter or exit the vehicle (Step S308).

When a fallen object 60 with a height of equal to or greater than $h_l-m$ is present at the target stop position, the vehicle control device 10 determines whether the fallen object 60 can be avoided by moving the target stop position rightwards or leftwards in the bus stop 50 (Step S309). That is, the vehicle control device 10 determines whether this case is the case illustrated in FIGS. 6B and 6C. When this case corresponds to the case illustrated in FIGS. 6B and 6C, the vehicle control device 10 moves the target stop position to a position at which the fallen object 60 can be avoided rightwards or leftwards in the bus stop 50 (Step S310). Then, the vehicle control device 10 causes the vehicle 2 to arrive at the changed target stop position and causes the vehicle 2 to stop at that position (Step S307) and changes the vehicle height from $h_m$ to $h_l$ (Step S308).

When this case does not correspond to the case illustrated in FIG. 6B nor the case illustrated in FIG. 6C, the height of the fallen object 60 is stored in the parameter $h_d$ (Step S311). The vehicle control device 10 determines whether $h_d$ and $h_h$ satisfy Relational Expression (1) (Step S312). When Relational Expression (1) is satisfied, the vehicle control device 10 causes the vehicle 2 to stop immediately before the fallen object 60 (Step S318).

When Relational Expression (1) is not satisfied, the vehicle control device 10 determines whether $h_d$ and $h_m$ satisfy Relational Expression (2) (Step S313).

When Relational Expression (2) is not satisfied, the vehicle control device 10 causes the vehicle 2 to arrive at the original target stop position and causes the vehicle 2 to stop at that position (Step S314). Then, the vehicle control device 10 changes the vehicle height from $h_m$ to $h_d+m$ (Step S315). On the other hand, when Relational Expression (2) is satisfied, first, the vehicle control device 10 changes the vehicle height from $h_m$ to $h_d+m$ (Step S316). Then, the vehicle control device 10 causes the vehicle 2 to arrive at the original target stop position and causes the vehicle 2 to stop at that position while maintaining the vehicle height at $h_d+m$ (Step S317).

When the vehicle 2 stops at the bus stop 50, an occupant enters or exits the vehicle at a position different from the predetermined stop position 52 by allowing the vehicle control device 10 to perform the vehicle control according to the aforementioned routine. However, since the vehicle height is adjusted to a vehicle height corresponding to entrance/exit conditions at the changed stop position 53, it is possible to provide comfortable entrance or exit to the occupant while preventing interference between the vehicle 2 and the fallen object 60.

4. Fourth Embodiment 4-1. Outline

An outline of a fourth embodiment will be described below with reference to FIGS. 8A and 8B.

Figure 8A:
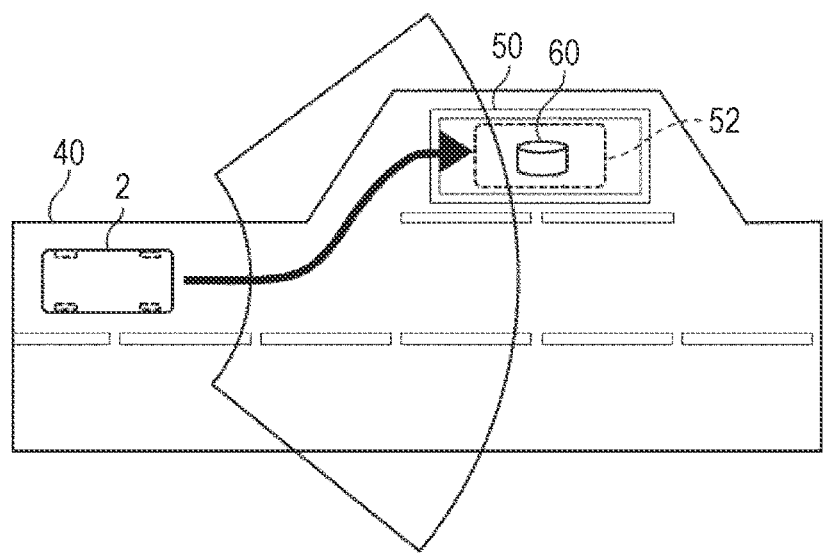
FIG. 8A is a diagram illustrating an outline of a fourth embodiment of the disclosure.
Figure 8B:
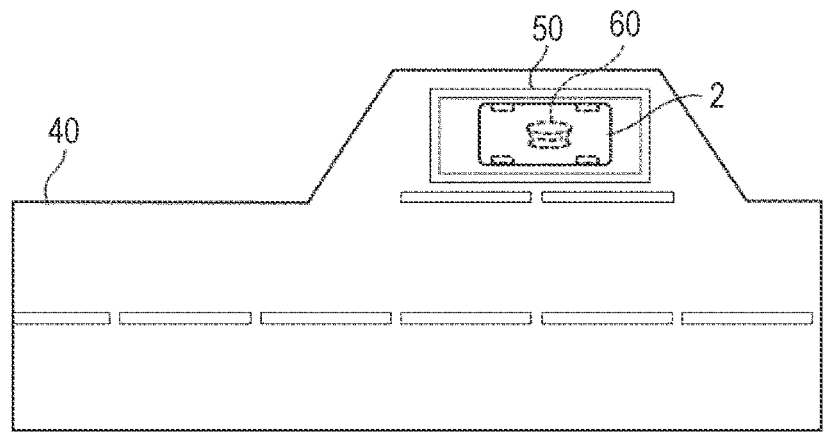
FIG. 8B is a diagram illustrating the outline of the fourth embodiment of the disclosure.

In the first embodiment, as illustrated in FIG. 8A, the vehicle 2 is caused to stop at the predetermined stop position 52 in the bus stop 50 and the vehicle height thereof is adjusted such that the vehicle 2 does not interfere with the fallen object 60. However, when a fallen object 60 is present at the predetermined stop position 52, the fallen object 60 may be an object that causes no problem even if the fallen object 60 is trodden. For example, the object that causes no problem even if it is trodden is an object that does not damage the vehicle 2 such as a plastic bag without contents, a bag without contents, grass, or a balloon.

In the fourth embodiment, it is determined whether a fallen object 60 is an object that causes no problem even if it is trodden based on information from the outside sensor. When the fallen object 60 is an object that causes no problem even if it is trodden, the vehicle 2 is caused to stop at a predetermined stop position 52 in a bus stop 50 as illustrated in FIG. 8B. Then, without avoiding interference with the fallen object 60, the vehicle height is adjusted to a vehicle height corresponding to entrance/exit conditions at the predetermined stop position 52. At the predetermined stop position 52, the vehicle height can be decreased to the lowest vehicle height.

4-2. Vehicle Control at the Time of Stopping

Figure 9:
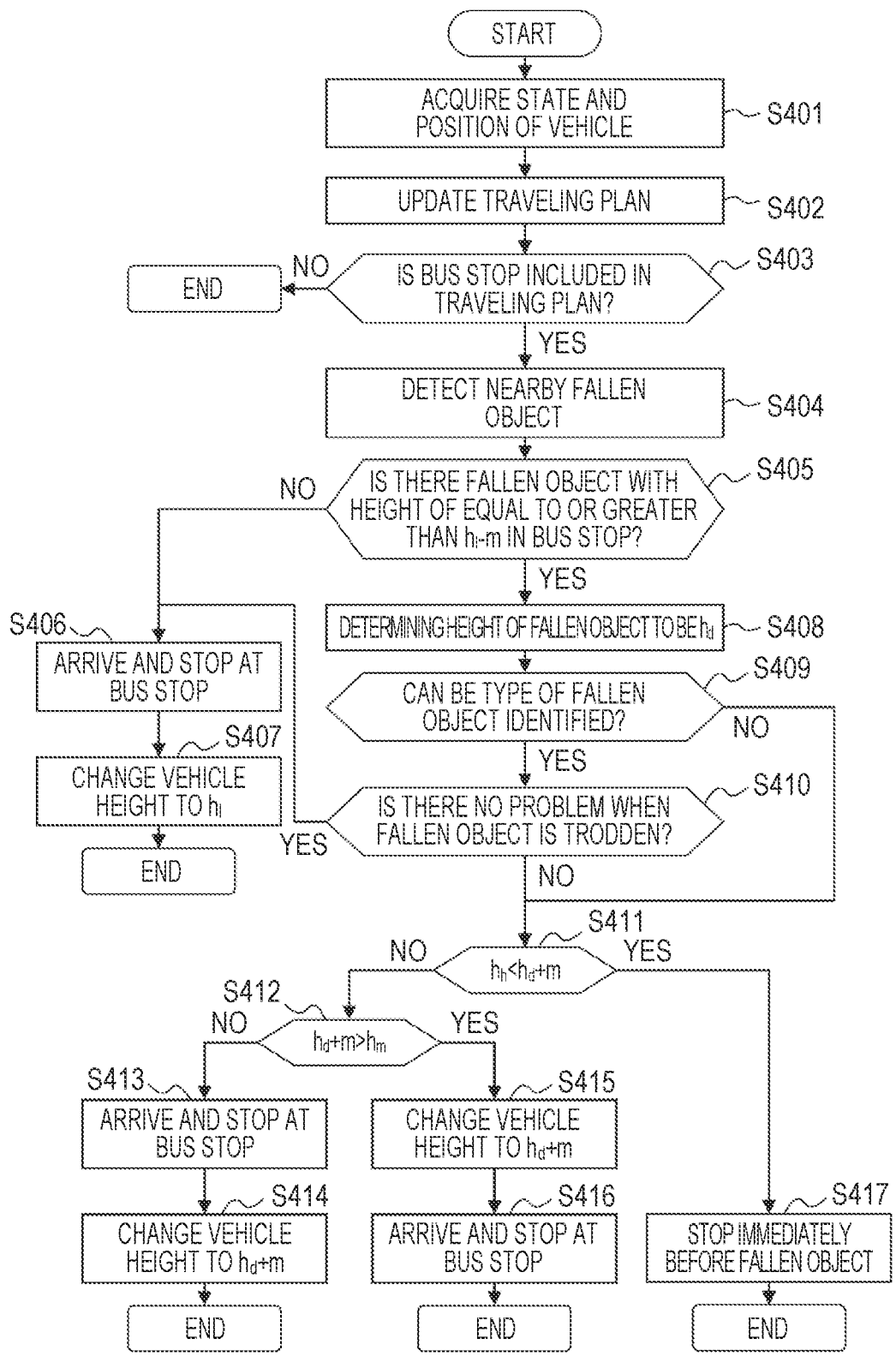
FIG. 9 is a flowchart illustrating a routine of vehicle control at the time of stopping according to the fourth embodiment of the disclosure.

Details of vehicle control at the time of stopping according to the fourth embodiment will be described below with reference to FIG. 9. FIG. 9 is a flowchart illustrating a routine of vehicle control which is performed by the vehicle control device 10 when a vehicle 2 stops at a bus stop 50.

In the flowchart illustrated in FIG. 9, first, the vehicle control device 10 acquires a state and a position of a vehicle 2 (Step S401) and updates a traveling plan (Step S402). Then, the vehicle control device 10 determines whether a bus stop 50 is included in the traveling plan (Step S403). When a bus stop 50 is not included, the vehicle control at the time of stopping ends.

When a bus stop 50 is included, the vehicle control device 10 detects a nearby fallen object using the outside sensor 8 (Step S404). Based on a result of detection, the vehicle control device 10 determines whether there is a fallen object with a height of equal to or greater than $h_l-m$ in the bus stop 50 (Step S405). When there is not such a fallen object, the vehicle control device 10 causes the vehicle 2 to arrive in the bus stop 50 and causes the vehicle 2 to stop at the predetermined stop position 52 (Step S406). Then, the vehicle control device 10 changes the vehicle height from $h_m$ to $h_l$ such that an occupant can easily enter or exit the vehicle (Step S407).

When a fallen object 60 with a height of equal to or greater than $h_l-m$ is present in the bus stop 50, the height of the fallen object 60 is stored as the parameter $h_d$ (Step S408). The vehicle control device 10 identifies a type of the fallen object 60 based on information acquired from the outside sensor 8 (Step S409). For example, image recognition using pattern matching or deep learning is used to identify the type of the fallen object 60. When the type of the fallen object 60 could be identified, the vehicle control device 10 determines whether the fallen object 60 is an object that causes no problem even if it is trodden based on the result of identification (Step S410).

When the fallen object 60 is an object that causes no problem even if it is trodden, the vehicle control device 10 causes the vehicle 2 to arrive at the bus stop 50 and causes the vehicle 2 to stop at the predetermined stop position 52 (Step S406). Then, the vehicle control device 10 changes the vehicle height from $h_m$ to $h_l$ such that an occupant can easily enter or exit the vehicle (Step S407). At this time, the fallen object 60 is trodden by tires of the vehicle 2 or is pressed by the bottom 3 of the vehicle 2. Since it is known that the fallen object 60 is an object that causes no problem even if it is trodden, no trouble is caused thereby.

When the fallen object 60 is an object which should not be trodden and when the type of the fallen object 60 is unclear, the fallen object 60 cannot be trodden. In this case, the vehicle control device 10 determines whether $h_d$ and $h_h$ satisfy Relational Expression (1) (Step S411). When Relational Expression (1) is satisfied, the vehicle control device 10 causes the vehicle 2 to stop immediately before the fallen object 60 (Step S417).

When Relational Expression (1) is not satisfied, the vehicle control device 10 determines whether $h_d$ and $h_m$ satisfy Relational Expression (2) (Step S412).

When Relational Expression (2) is not satisfied, the vehicle control device 10 causes the vehicle 2 to arrive at the bus stop 50 and causes the vehicle 2 to stop at the predetermined stop position 52 (Step S413). Then, the vehicle control device 10 changes the vehicle height from $h_m$ to $h_d$+m (Step S414). On the other hand, when Relational Expression (2) is satisfied, first, the vehicle control device 10 changes the vehicle height from $h_m$ to $h_d$+m (Step S415). Then, the vehicle control device 10 causes the vehicle 2 to arrive at the bus stop 50 and causes the vehicle 2 to stop at the predetermined stop position 52 while maintaining the vehicle height at $h_d$+m (Step S416).

When the vehicle 2 stops at the bus stop 50, the fallen object 60 is not intentionally avoided depending on the type of the fallen object 60 and comfortable entrance/exit is provided to an occupant at the original position at which the occupant is to enter or exit the vehicle by allowing the vehicle control device 10 to perform the vehicle control according to the aforementioned routine.

5. Fifth Embodiment

5-1. Outline

An outline of a fifth embodiment will be described below with reference to FIGS. 10A and 10B.

Figure 10A:
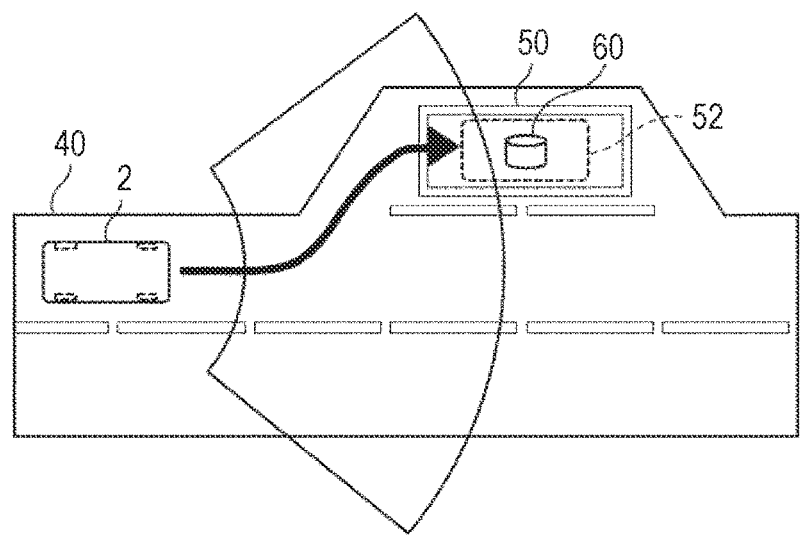
FIG. 10A is a diagram illustrating an outline of a fifth embodiment of the disclosure.

In the fourth embodiment, a type of a fallen object 60 is identified based on information from the outside sensor, and the vehicle 2 is caused to stop at a predetermined stop position 52 in a bus stop 50 as illustrated in FIG. 10A and the vehicle height is decreased to the lowest vehicle height when the fallen object 60 is an object that causes no problem even if it is trodden. However, there may be various types of fallen objects and directions, shapes, colors, and the like thereof cannot be predicted. Accordingly, it is not easy to identify a type of a fallen object using an existing technique such as image recognition.

Figure 10B:
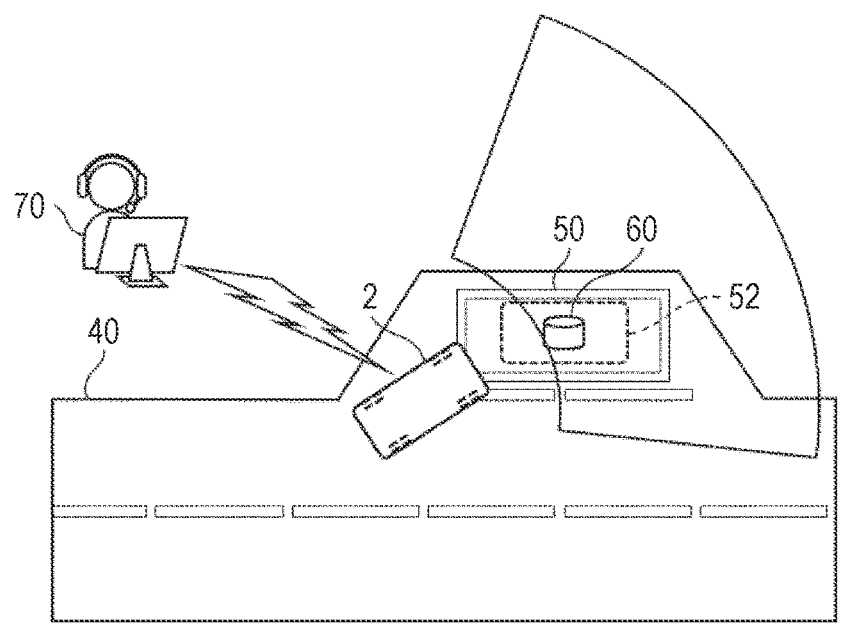
FIG. 10B is a diagram illustrating the outline of the fifth embodiment of the disclosure.

Therefore, in the fifth embodiment, when a type of a fallen object 60 cannot be identified based on information from the outside sensor, the vehicle 2 is caused to stop at a position at which the fallen object 60 can be ascertained by the outside sensor as illustrated in FIG. 10B. Then, the vehicle 2 is caused to communicate with an operator 70 which is a human being and the operator 70 is caused to determine whether there is no problem even if the fallen object 60 is trodden. The operator 70 may be a person in charge waiting in the vehicle in preparation for troubles or may be a remote support operator who provides support from a remote place via a radio communication network.

5-2. Configuration of Autonomous Driving Vehicle

Figure 11:
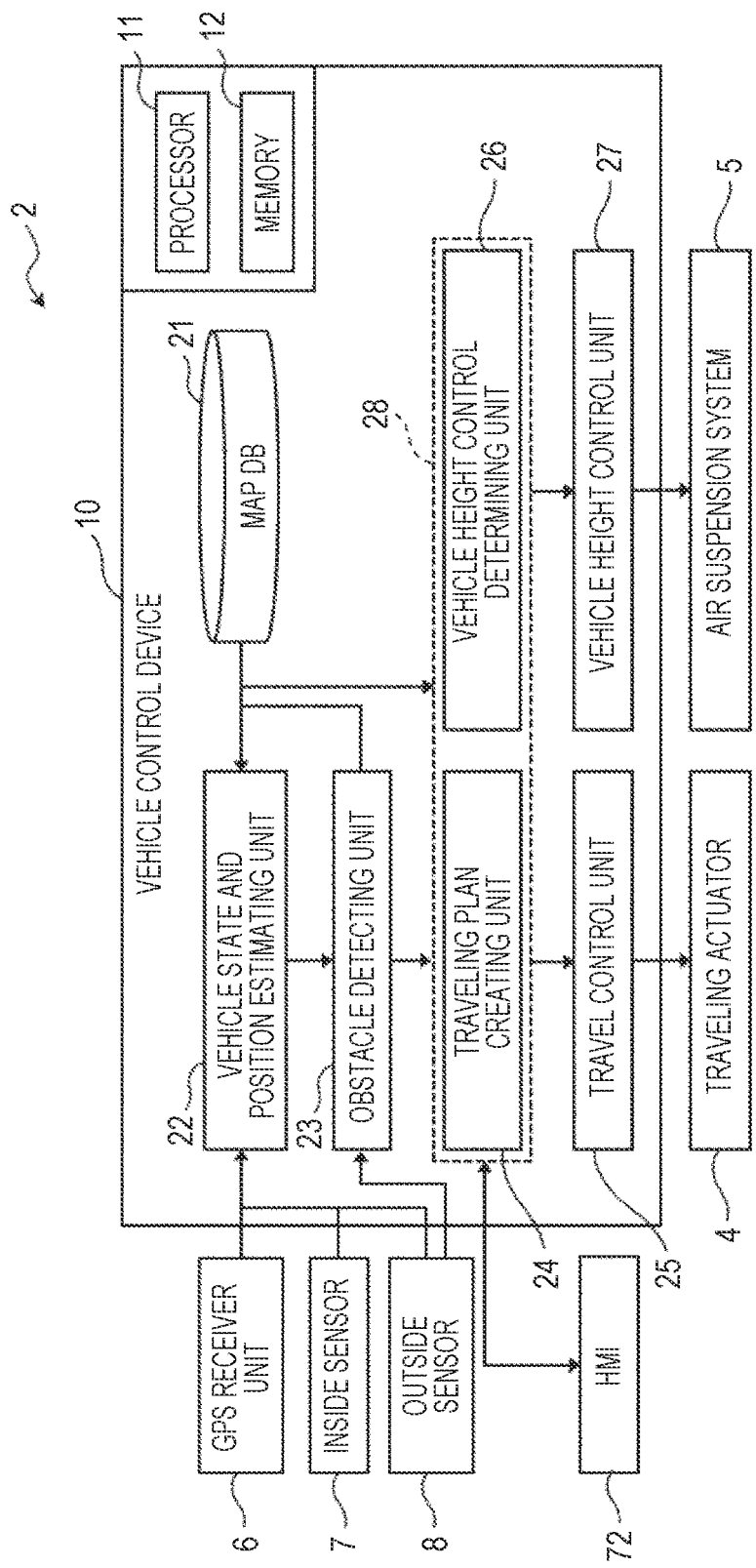
FIG. 11 is a block diagram illustrating a configuration of an autonomous driving vehicle according to the fifth embodiment of the disclosure.

FIG. 11 is a block diagram illustrating a configuration of a vehicle 2 which is an autonomous driving vehicle according to the fifth embodiment. A vehicle 2 according to the fifth embodiment is different from autonomous driving vehicles according to the aforementioned embodiments in that an HMI 72 is provided. The HMI 72 is an interface that is used to output and input information between an operator 70 and the autonomous driving system 28. For example, the HMI 72 includes a display panel that displays image information to the operator 70, a speaker that outputs voice, and an operation button or a touch panel that is used for the operator 70 to perform an input operation. When an operator 70 in a remote support center performs support, the HMI 72 is provided in the remote support center and the HMI 72 includes a communication device for communication between the vehicle 2 and the remote support center.

5-3. Vehicle Control at the Time of Stopping

Figure 12:
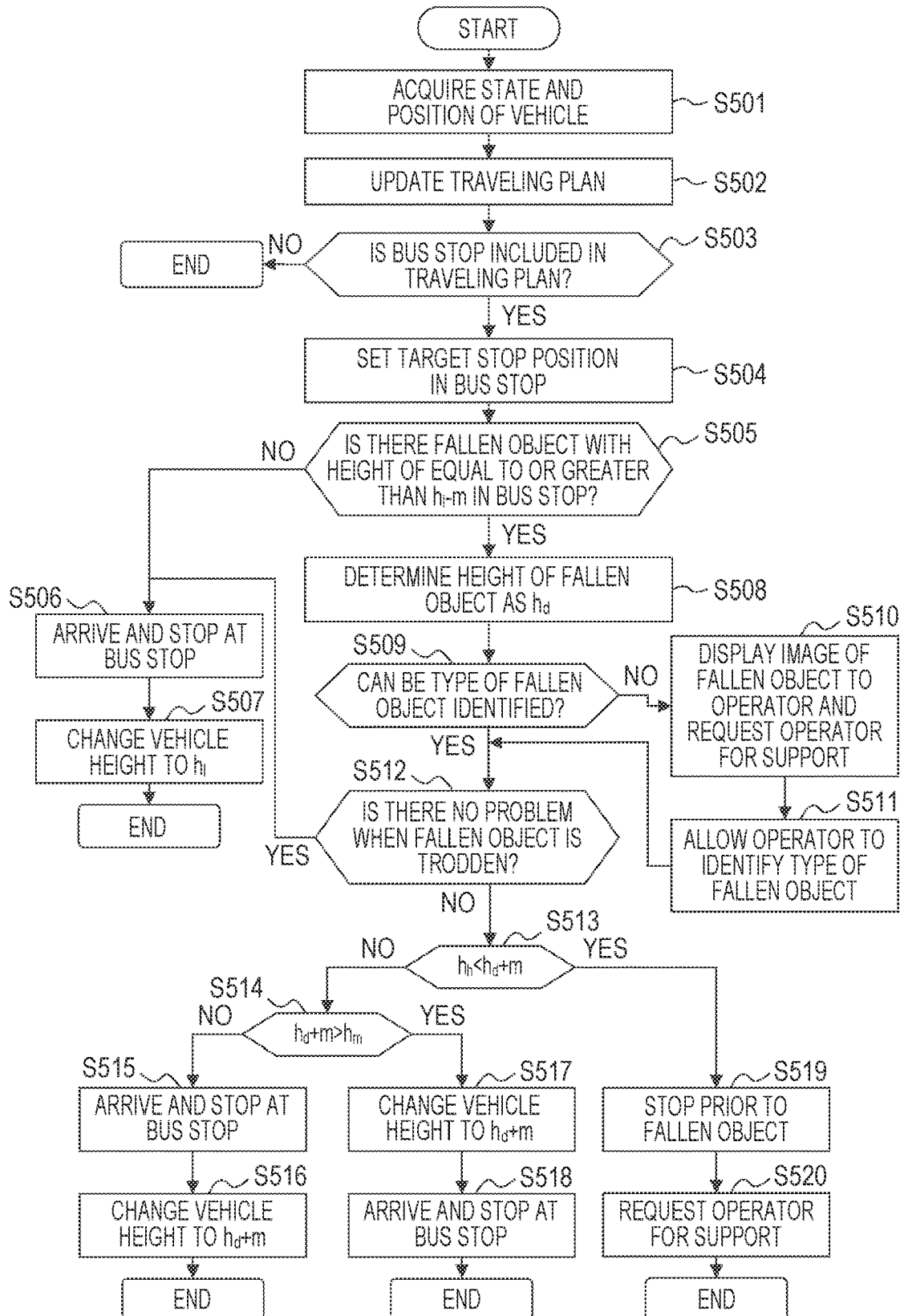
FIG. 12 is a flowchart illustrating a routine of vehicle control at the time of stopping according to the fifth embodiment of the disclosure.

Details of vehicle control at the time of stopping according to the fifth embodiment will be described below with reference to FIG. 12. FIG. 12 is a flowchart illustrating a routine of vehicle control which is performed by the vehicle control device 10 when a vehicle 2 stops at a bus stop 50.

In the flowchart illustrated in FIG. 12, first, the vehicle control device 10 acquires a state and a position of a vehicle 2 (Step S501) and updates a traveling plan (Step S502). Then, the vehicle control device 10 determines whether a bus stop 50 is included in the traveling plan (Step S503). When a bus stop 50 is not included, the vehicle control at the time of stopping ends.

When a bus stop 50 is included, the vehicle control device 10 detects a nearby fallen object using the outside sensor 8 (Step S504). Based on a result of detection, the vehicle control device 10 determines whether there is a fallen object with a height of equal to or greater than $h_l$–m in the bus stop 50 (Step S505). When there is not such a fallen object, the vehicle control device 10 causes the vehicle 2 to arrive at the bus stop 50 and causes the vehicle 2 to stop at the predetermined stop position 52 (Step S506). Then, the vehicle control device 10 changes the vehicle height from $h_m$ to $h_l$ such that an occupant can easily enter or exit the vehicle (Step S507).

When a fallen object 60 with a height of equal to or greater than $h_l$–m is present in the bus stop 50, the height of the fallen object 60 is stored as the parameter $h_d$ (Step S508). The vehicle control device 10 identifies a type of the fallen object 60 based on information acquired from the outside sensor 8 (Step S509). When the type of the fallen object 60 could be identified, the vehicle control device 10 determines whether the fallen object 60 is an object that causes no problem even if it is trodden based on the result of identification (Step S512).

When the type of the fallen object 60 cannot be identified, the vehicle control device 10 sends an image obtained by imaging the fallen object 60 to an operator 70, and requests the operator 70 to support identification of the type of the fallen object 60 (Step S510). The operator 70 identifies the type of the fallen object 60 from the image of the fallen object 60 which is displayed on the display of the HMI 72 (Step S511). A result of identification of the fallen object 60 is input from the operator 70 to the vehicle control device 10 via the HMI 72. When the result of identification of the fallen object 60 is input from the operator 70, the vehicle control device 10 determines whether the fallen object 60 is an object that causes no problem even if it is trodden (Step S512).

When the fallen object 60 is an object that causes no problem even if it is trodden, the vehicle control device 10 causes the vehicle 2 to arrive at the bus stop 50 and causes the vehicle 2 to stop at the predetermined stop position 52 (Step S506). Then, the vehicle control device 10 changes the vehicle height from $h_m$ to $h_l$ such that an occupant can easily enter or exit the vehicle (Step S507).

When the fallen object 60 is an object which should not be trodden, the vehicle control device 10 determines whether $h_d$ and $h_h$ satisfy Relational Expression (1) (Step S513). When Relational Expression (1) is not satisfied, the vehicle control device 10 determines whether $h_d$ and $h_m$ satisfy Relational Expression (2) (Step S514).

When Relational Expression (2) is not satisfied, the vehicle control device 10 causes the vehicle 2 to arrive at the bus stop 50 and causes the vehicle 2 to stop at the predetermined stop position 52 (Step S515). Then, the vehicle control device 10 changes the vehicle height from $h_m$ to $h_d$+m (Step S516). On the other hand, when Relational Expression (2) is satisfied, first, the vehicle control device 10 changes the vehicle height from $h_m$ to $h_d$+m (Step S517). Then, the vehicle control device 10 causes the vehicle 2 to arrive at the bus stop 50 and causes the vehicle 2 to stop at the predetermined stop position 52 while maintaining the vehicle height at $h_d$+m (Step S518).

When Relational Expression (1) is satisfied, the vehicle control device 10 causes the vehicle 2 to stop immediately before the fallen object 60 (Step S519) and requests the operator 70 to support the operation of the vehicle 2 (Step S520). The operator 70 supports the vehicle control device 10 based on information on outside circumstances of the vehicle 2 which is transmitted from the vehicle control device 10. The support which is provided by the operator 70 is, for example, selection of GO/NO-GO, selection of an operation plan, and a remote operation of a steering wheel.

When the vehicle 2 stops at the bus stop 50, the vehicle control device 10 can accurately determine the type of the fallen object 60 based on support from the operator 70 even if the type of the fallen object 60 cannot be identified by causing the vehicle control device 10 to perform the vehicle control in accordance with the aforementioned routine. Since support from the operator 70 can be provided in a situation with which the vehicle control device 10 cannot cope, it is possible to prevent the vehicle from becoming stuck before a fallen object 60.

6. Sixth Embodiment

6-1. Outline

An outline of a sixth embodiment will be described below with reference to FIGS. 13A and 13B.

Figure 13A:
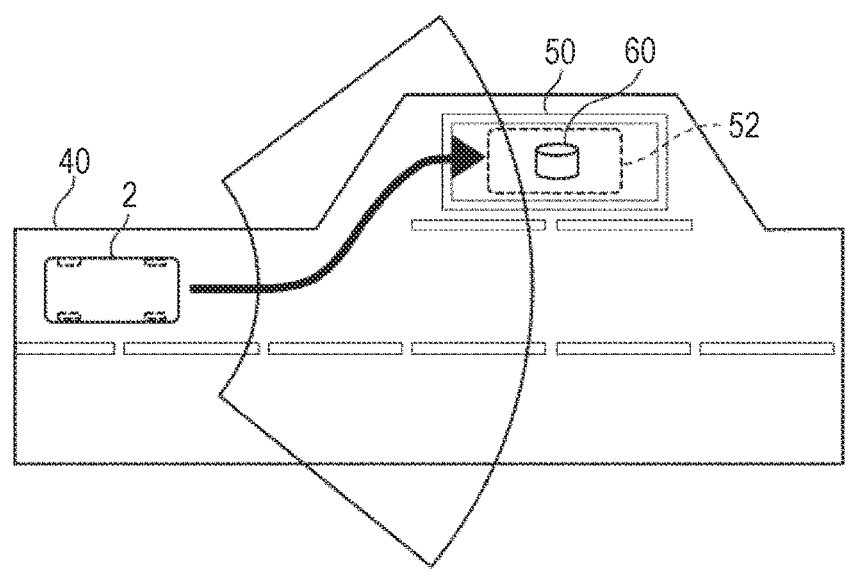
FIG. 13A is a diagram illustrating an outline of a sixth embodiment of the disclosure.

In the first embodiment, as illustrated in FIG. 13A, a vehicle 2 is caused to stop at a predetermined stop position 52 in a bus stop 50 and the vehicle height thereof is adjusted such that the vehicle 2 does not interfere with a fallen object 60. In the other embodiments, a vehicle 2 is caused to stop in a bus stop 50 and the vehicle height is adjusted for the purpose of an occupant's entrance/exit in the bus stop 50. However, depending on a relationship between a position of a fallen object 60 and the size of the fallen object 60, it may be difficult to cause the vehicle 2 to stop in the bus stop 50. In this case, the vehicle 2 has to wait before the bus stop 50 until someone removes the fallen object 60 or the fallen object 60 is moved by wind.

Figure 13B:
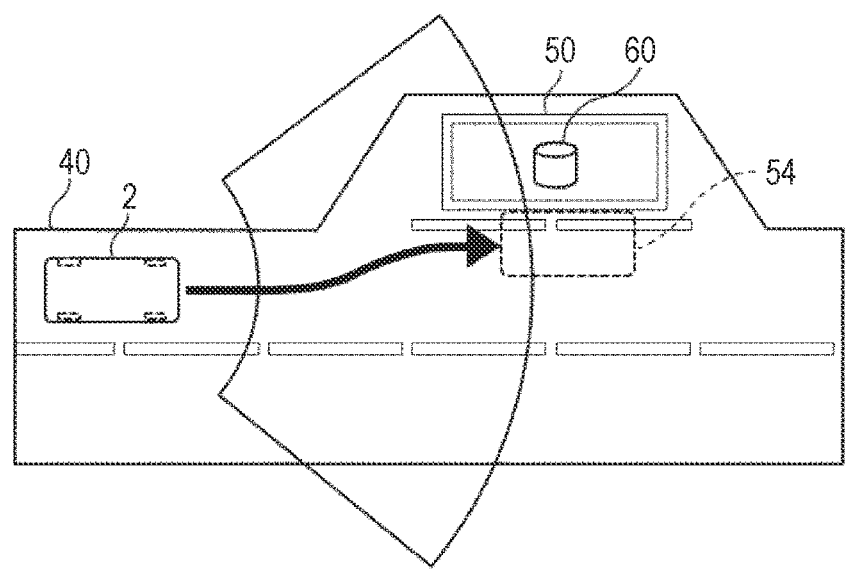
FIG. 13B is a diagram illustrating the outline of the sixth embodiment of the disclosure.

Therefore, in the sixth embodiment, when stopping on a road 40 on which the vehicle 2 is traveling is not prohibited, a stop position 54 is changed to an area (for example, a road shoulder) outside of the bus stop 50 as illustrated in FIG. 13B, and the vehicle 2 is caused to stop outside the bus stop 50. In this case, the area outside the bus stop 50 in which the stop position 54 is set is also considered as an area in which stopping is possible in the same way as inside the bus stop 50. At the stop position 54, the vehicle height is adjusted to a vehicle height corresponding to entrance/exit conditions at the stop position 54.

6-2. Vehicle Control at the Time of Stopping

Figure 14:
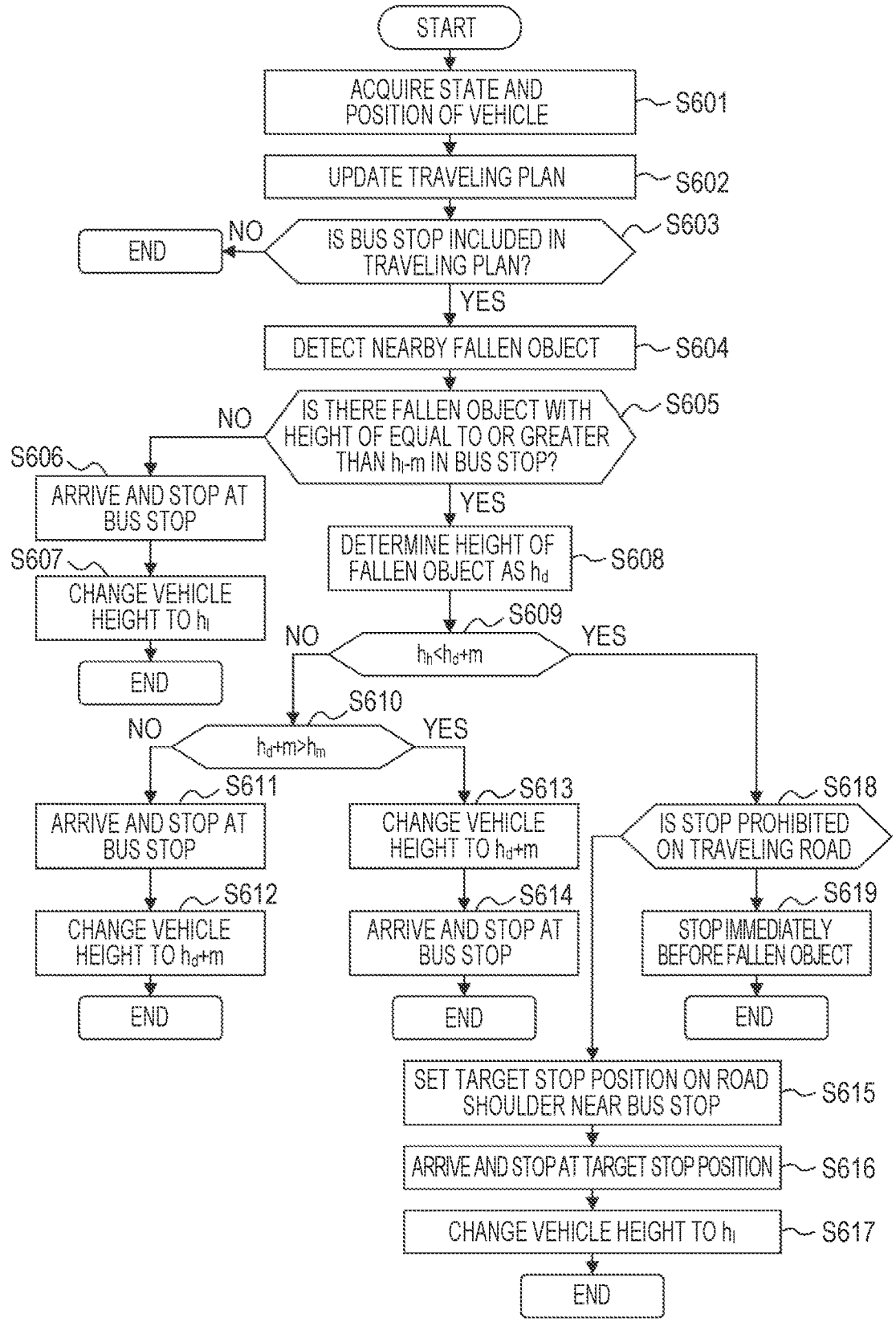
FIG. 14 is a flowchart illustrating a routine of vehicle control at the time of stopping according to the sixth embodiment of the disclosure.

Details of vehicle control at the time of stopping according to the sixth embodiment will be described below with reference to FIG. 14. FIG. 14 is a flowchart illustrating a routine of vehicle control which is performed by the vehicle control device 10 when a vehicle 2 stops at a bus stop 50.

The processes of Steps S601 to S614 in the flowchart illustrated in FIG. 14 are the same as the processes of Steps S101 to S114 in the flowchart of the first embodiment illustrated in FIG. 3. Accordingly, description of the processes of Steps S601 to S614 will be omitted.

In the flowchart illustrated in FIG. 14, when Relational Expression (1) is satisfied in Step S609, the vehicle control device 10 determines whether stopping on a road 40 on which the vehicle is traveling is prohibited (Step S618). This determination is performed based on road information which is registered in the map DB 21. When stopping on the road 40 on which the vehicle is traveling is prohibited, the vehicle control device 10 causes the vehicle 2 to stop immediately before the fallen object 60 (Step S619). In this case, the vehicle control device 10 requests an occupant or a person near the vehicle 2 to give a hand such that the fallen object 60 in front of the vehicle 2 is removed.

When stopping on the road 40 on which the vehicle is traveling is not prohibited, the vehicle control device 10 sets a target stop position 54 on a road shoulder near the bus stop 50 (Step S615). In consideration of convenience of an occupant's entrance/exit, it is desirable that the target stop position 54 be as close to the original stop position (the predetermined stop position 52) as possible. The vehicle control device 10 causes the vehicle 2 to arrive at the changed target stop position 54 and to stop at that position (Step S616), and changes the vehicle height from $h_m$ to $h_l$ (Step S617).

By causing the vehicle control device 10 to perform the vehicle control in accordance with the aforementioned routine when the vehicle 2 stops at the bus stop 50, it is possible to cause the vehicle 2 to stop such that an occupant enters or exits the vehicle even when it is difficult to cause the vehicle 2 to stop in the bus stop 50. The occupant enters or exits the vehicle 2 at a position which is different from the predetermined stop position 52, but since the vehicle height is adjusted to a vehicle height corresponding to entrance/exit conditions at the changed stop position 54, it is possible to provide comfortable entrance/exit to the occupant while preventing interference between the vehicle 2 and the fallen object 60.

7. Other Embodiments

In the aforementioned embodiments, it is assumed that the number of fallen objects is one for the purpose of simplification of description, but vehicle control can be performed in accordance with the routines illustrated in the flowcharts even when there is a plurality of fallen objects. When there is a plurality of fallen objects, the plurality of fallen objects may be recognized as a single fallen object and the vehicle height may be adjusted based on a maximum height of the fallen objects which are recognized as a single object. Alternatively, the vehicle height may be adjusted based on a height of each of the plurality of fallen objects with each fallen object as a constraint condition.

The routines of vehicle control according to the aforementioned embodiments can be appropriately combined into practice. For example, the vehicle control according to the first embodiment and the vehicle control according to the second embodiment or the third embodiment may switch therebetween depending on a type of an occupant. For example, the vehicle control according to the second embodiment or the third embodiment may be selected when an aged person, a wheelchair user, a stroller user, or the like is included as an occupant, and the vehicle control according to the first embodiment may be selected otherwise. In the vehicle control according to the second embodiment or the third embodiment, an occupant enters or exits the vehicle at a position which is different from a predetermined stop position, but since a step difference between the floor of the vehicle and the road surface is kept low, an aged person or the like can enter or exit the vehicle comfortably. An occupant mentioned herein includes both an occupant who exits the vehicle and an occupant who enters the vehicle. The type of an occupant can be identified, for example, through image recognition using a camera.

What is claimed is:

1. A vehicle comprising:
   an outside sensor configured to acquire information on an outside circumstance of the vehicle;
   an air suspension system configured to adjust a vehicle height; and
   an electronic control unit configured to control the vehicle,
   wherein the electronic control unit is configured to:
      determine whether there is a fallen object with a height greater than or equal to a predetermined threshold in a bus stop;
      upon determination that there is not a fallen object with a height greater than or equal to the predetermined threshold in the bus stop, control the air suspension system to change the vehicle height to a first value based on a height of a station platform on which occupants are waiting;
      upon determination that the fallen object with the height greater than or equal to the predetermined threshold is in the bus stop, determine whether a greatest possible height of the vehicle is less than a sum of the height of the fallen object and a predetermined gap distance;
      upon determination that the greatest possible height of the vehicle is less than the sum, cause the vehicle to stop immediately before the fallen object; and
      upon determination that the greatest possible height of the vehicle is not less than the sum, cause the vehicle to arrive at the bus stop and control the air suspension system to change the vehicle height to the height of the object height plus the predetermined gap distance.

2. The vehicle according to claim 1, wherein the electronic control unit is configured to:
   change a stop position of the vehicle from the predetermined stop position to a position within an allowable area for stopping when the height of the obstacle is equal to or greater than a predetermined upper limit value, the position being a position at which the vehicle does not interfere with the obstacle; and
   control the air suspension system such that the vehicle height becomes a vehicle height corresponding to a platform condition at the changed stop position.

3. The vehicle according to claim 2, wherein the electronic control unit is configured to
   identify a type of the obstacle based on information acquired from the outside sensor,
      stop the vehicle at the predetermined stop position when the obstacle is an object that does not cause any problems about interference with the vehicle, and
      control the air suspension system such that the vehicle height becomes a vehicle height corresponding to a platform condition at the predetermined stop position.

4. The vehicle according to claim 3, further comprising a communication interface configured to communicate with an operator,
   wherein the electronic control unit is configured to
   provide an image of the obstacle to the operator, and
   acquire information on the type of the obstacle from the operator when the type of the obstacle is not identified.

5. The vehicle according to claim 2, further comprising an interface configured to communicate with an operator,
   wherein the electronic control unit is configured to request the operator for support and to operate the vehicle in accordance with an instruction from the operator when the vehicle is not able to stop within the allowable area for stopping without interfering with the obstacle.

6. The vehicle according to claim 1, wherein the vehicle is an autonomous driving vehicle.

7. A vehicle operating method for a vehicle including an air suspension system, the vehicle operating method comprising:
   determining whether there is a fallen object with a height greater than or equal to a predetermined threshold in a bus stop;
   upon determination that there is not a fallen object with the height greater than or equal to the predetermined threshold in the bus stop, controlling the air suspension system to change the vehicle height to a first value based on a height of a station platform on which occupants are waiting;
   upon determination that the fallen object with the height greater than or equal to the predetermined threshold is in the bus stop, determining whether a greatest possible height of the vehicle is less than a sum of the height of the fallen object and a predetermined gap distance;
   upon determination that the greatest possible height of the vehicle is less than the sum, causing the vehicle to stop immediately before the fallen object; and
   upon determination that the greatest possible height of the vehicle is not less than the sum, causing the vehicle to arrive at the bus stop and control the air suspension system to change the vehicle height to a height of the object height plus the predetermined gap distance.

8. The vehicle operating method according to claim 7, wherein the vehicle is an autonomous driving vehicle, and
   wherein the vehicle operating method is performed to allow the autonomous driving vehicle to travel autonomously.

* * * * *